United States Patent
Martin et al.

(10) Patent No.: US 7,240,041 B2
(45) Date of Patent: Jul. 3, 2007

(54) NETWORK MESSAGE PROCESSING USING INVERSE PATTERN MATCHING

(75) Inventors: Harold M. Martin, Austin, TX (US);
Carlos A. Greaves, Austin, TX (US);
Thang Q. Nguyen, Austin, TX (US);
Jose M. Nunez, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 560 days.

(21) Appl. No.: 10/721,196

(22) Filed: Nov. 25, 2003

(65) Prior Publication Data

US 2005/0108943 A1    May 26, 2005

(51) Int. Cl.
*G06F 17/00* (2006.01)
*G06N 5/02* (2006.01)

(52) U.S. Cl. ........................................ 706/48
(58) Field of Classification Search .................. 706/48, 706/206; 707/6; 709/201–245; 370/351–545
See application file for complete search history.

(56) References Cited

U.S. PATENT DOCUMENTS

| | | | |
|---|---|---|---|
| 5,414,704 A | 5/1995 | Spinney | |
| 5,473,607 A | 12/1995 | Hausman et al. | |
| 6,427,173 B1 | 7/2002 | Boucher et al. | |
| 6,529,508 B1 | 3/2003 | Li et al. | |
| 2002/0085560 A1 | 7/2002 | Cathey et al. | |
| 2003/0043825 A1 | 3/2003 | Magnussen et al. | |

FOREIGN PATENT DOCUMENTS

| | | |
|---|---|---|
| EP | 0 522 743 A1 | 1/1993 |
| EP | 0 948 854 B1 | 10/1999 |
| WO | WO 99/53647 | 10/1999 |

*Primary Examiner*—Anthony Knight
*Assistant Examiner*—Michael B. Holmes
(74) *Attorney, Agent, or Firm*—Michael P. Noonan; Joanna G. Chui; Ranjeev Singh

(57) ABSTRACT

Hashing and pattern matching are used in an information processing system to process incoming messages from a network such as an Ethernet-based network. Using hashing and pattern matching increases the efficiency of message acceptance and rejection without increasing software-based processor tasks. A hash function and a pattern matching function are performed on a message received by an information processing system, and the message is selectively accepted based on at least one of a hash result and a pattern matching result. The incoming message can be searched for the existence of patterns and the absence of the patterns. The incoming message can be searched for the existence of multiple patterns. The results of pattern matching can be used not only for acceptance and rejection of messages, but also for other post-receipt tasks such as selective storage of incoming messages according to identified relative priorities or absolute criticality of messages having particular pattern matches.

30 Claims, 10 Drawing Sheets

| DESTINATION ADDRESS (6 BYTES) | GENERATED CRC | HASH BUCKET | |
|---|---|---|---|
| 0x0050fc0491b7 | 0x04b01301 | 4 | ← 1201 |
| 0x0050fc0491dc | 0x0fad155a | 15 | ← 1202 |
| 0x0050fc049210 | 0x1516eac7 | 21 | ← 1203 |
| 0x0050fc049211 | 0x7c1a0a29 | 124 | ← 1204 |
| 0x0050fc049212 | 0x21909ab0 | 33 | ← 1205 |
| 0x0050fc03cee3 | 0xcbf3452b | 203 | ← 1206 |
| 0x4445535403e2 | 0x15f8525c | 21 | ← 1207 |
| 0x00062590d0c5 | 0x04fd2d83 | 4 | ← 1208 |
| 0x444553540cc7 | 0x04fffa8a | 4 | ← 1209 |
| 0x0050fc03d535 | 0x15ce2448 | 21 | ← 1210 |

NETWORK MESSAGE PROCESSING USING INVERSE PATTERN MATCHING

CROSS-REFERENCE TO RELATED APPLICATION(S)

This application is related to U.S. patent application Ser. No. 10/721,201, entitled "Network Message Hash Filtering Using Pattern Matching," filed on this date, naming Carlos A. Greaves, Harold M. Martin, Thang Q. Nguyen and Jose M. Nunez as inventors, assigned to the assignee of the present invention, and which is incorporated herein by reference.

BACKGROUND

1. Field

The present invention relates to network communication, and, more particularly, to processing messages received via a network such as an Ethernet network.

2. Related Art

Local area networks (LANs), wide area networks (WANs) and other types of networks typically include a number of information processing systems coupled via connections operating according to various packet based communications protocols. For example, the Ethernet IEEE 802.3 protocol is a widely used LAN protocol based on the carrier-sense multiple access/collision detect (CSMA/CD) approach. Because Ethernet and IEEE 802.3 protocols are similar and can coexist on the same LAN, both are sometimes referred to as Ethernet. 10/100 Ethernet provides increased Ethernet speed from 10 to 100 megabits per second (Mbps) and provides a simple, cost-effective option for backbone and server connectivity. Gigabit Ethernet is another Ethernet protocol which builds on top of the basic Ethernet protocol, but increases speed tenfold over 10/100 Ethernet to 1000 Mbps, or one gigabits per second (Gbps).

Devices in a network often receive messages which are intended for them and messages which are not intended for them. Thus, such devices must locally analyze each incoming message to determine if they should accept the message. Typically each device has an address which must be compared to an address in each received message in some form. An exact address match is computationally intensive because of address length and the large numbers of addresses to be compared. Because a device can accept messages for a number of other devices, and a very large number of messages may be received, and the speed of networks is increasing, the problem of processing (e.g., accepting or rejecting) incoming messages can cause a bottleneck at various devices in a network and slow down overall performance. Traditional destination address recognition methods require post filtering which is done at higher Open Systems Interconnection (OSI) levels than the media access control (MAC) level and require significant software and general processing hardware intervention. Some techniques employ content addressable memories (CAMs) but such techniques are typically expensive, excessively power consumptive, and inflexible. Thus, there is a need to enhance the performance of processing incoming messages.

In addition to merely accepting or rejecting incoming messages, each device typically has various tasks to perform responsive to receiving the messages. Accordingly, some data received by messages needs to be stored and accessed within a short amount of time. Thus, it would be advantageous to enhance the processing of such messages by preprocessing the received messages (e.g., by sorting inbound messages before they are examined by a processor or software driven system resources) to free the use of such resources for other tasks and to reduce the latency of accessing critical or high priority frames.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

FIG. 12 is a table illustrating a number of addresses processed using hashing and/or pattern matching.

DETAILED DESCRIPTION

The following discussion is intended to provide a detailed description of at least one example of the invention and should not be taken to be limiting of the invention itself. Rather, any number of variations may fall within the scope of the invention which is properly defined in the claims following this description.

Figure 1:
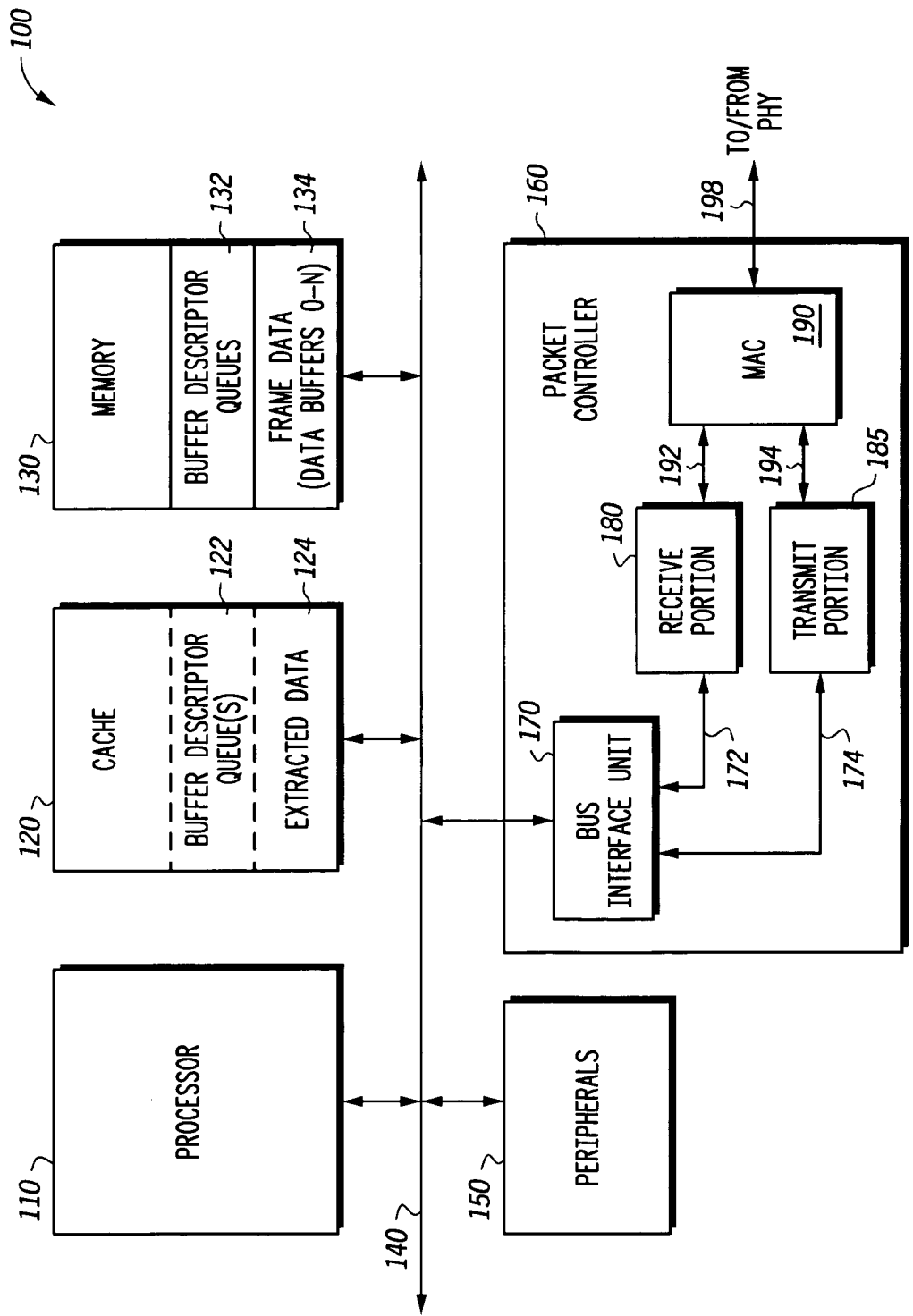
FIG. 1 is a block diagram illustrating an information processing and communication system in accordance with an embodiment of the invention.

FIG. 1 is a block diagram illustrating an information processing and communication system 100 in accordance with an embodiment of the invention. System 100 includes processor 110, cache 120, memory 130, system bus 140, peripherals 150 and packet controller 160. Processor 110, cache 120, memory 130, peripherals 150 and packet controller 160 are all coupled via system bus 140. System 100 may be an Ethernet, Gig-Ethernet and/or XGig-Ethernet controller or otherwise compatible therewith, may be a network switch or router, or other type of device for communicating within a network.

Packet controller 160 includes bus interface unit (BIU) 170, receive portion 180, transmit portion 185 and media access controller (MAC) 190. Bus interface unit 170 is coupled to system bus 140. Bus interface unit 170 is coupled to receive portion 180 via connection 172 and to transmit portion 185 via connection 174. MAC 190 is coupled to receive portion 180 via connection 192 and to transmit portion 185 via connection 194. MAC 190 is coupled to physical layer hardware to receive messages such as packets from other devices via physical (PHY) connection 198.

Messages are received at MAC 190 and passed to receive portion 180. The messages may or may not be accepted depending on address recognition, hashing, pattern matching, or hashing and pattern matching (e.g., as described below at least with reference to FIGS. 2-9). Information from accepted messages is passed to memory 130. Certain information may be identified by pattern matching to be especially eligible for quick access by processor 110 or other system resources, in which case such information is extracted from the normal message data sent to memory 130, and the extracted data is stashed in cache 120 (e.g., as described below at least with reference to FIGS. 2-6 and 10-11).

The disclosed destination address recognition protocol minimizes the need for post filtering and can be done at the media access control level instead of requiring further software and hardware intervention at higher OSI levels. For some sets of addresses, the user could find a set of patterns that yields perfect filtering at the MAC level. A deterministic algorithm may be used to generate the required patterns to ensure perfect hash-time filtering. The disclosed protocol also enables pattern match searching throughout an accepted frame, not merely within a destination address, to refine the results of the hash-time filtering.

Memory 130 includes frame data buffers 134 for storing incoming messages and buffer descriptor queues 132 for tracking the stored messages as described in further detail below. Cache 120 includes storage locations which may store one or more buffer descriptor queues 122 and storage locations for stashing (i.e., storing) extracted data 124 for subsequent use by processor 110. Extracted data is data which is extracted from the normal frame data of incoming messages for storage in cache 120 according to certain pattern matching protocols described herein. Extracted data may be, for example, critical data, quality of service (QOS) level data or other high priority data for which expedited access times might be desirable. Memory 130 and cache 120 are accessible by processor 110 and may even be accessible by other devices or processors (not shown) within system 100.

Figure 2:
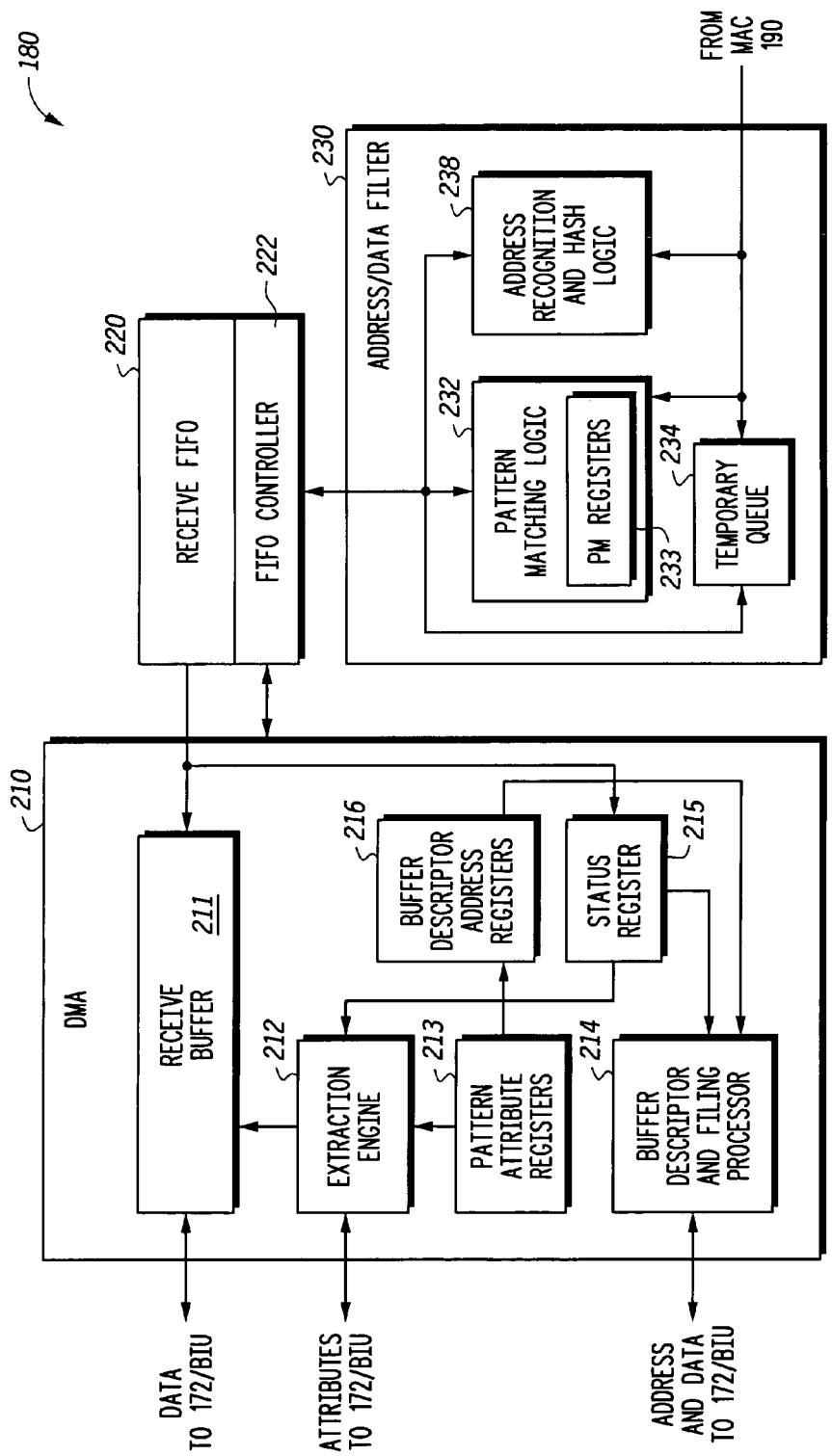
FIG. 2 is a block diagram illustrating a receive portion of a packet controller of the system of FIG. 1.

FIG. 2 is a block diagram illustrating receive portion 180 of packet controller 160 of system 100. Receive portion 180 includes direct memory access (DMA) controller 210, receive FIFO 220 and address/data filter (ADF) 230. ADF 230 is coupled to receive messages from MAC 190 and to selectively provide such messages to FIFO 220. An exemplary message packet with a frame receivable by address/data filter 230 is discussed in greater detail below with reference to FIG. 3. DMA 210 is coupled to receive message information (e.g., address and data information, and message filter results such as pattern status information described below) from receive FIFO 220 under control of FIFO controller 222.

ADF 230 includes temporary queue 234, pattern matching logic 232 and address recognition and hash logic 238. Each of temporary queue 234, pattern matching logic 232 and address recognition and hash logic 238 are coupled to receive messages (e.g., frames) from MAC 190. Temporary queue 234 is coupled to receive message filter result information from pattern matching logic 232 and address recognition and hash logic 238, and to provide the frames (or portions thereof) and the message filter information to receive FIFO 220 in response thereto.

Without pattern matching and hashing logic, a direct and full address compare would have to be performed between the destination address of every received message and the address of system 100 or other systems for which system 100 is configured to accept messages. Such a full address compare typically involves interrupting processor 110 in some form since the comparison typically occurs under control of software.

However, in the illustrated embodiment, pattern matching logic 232 and hashing logic 238 are provided to lessen the frequency of occurrence of full address compares, thereby allowing processor 110 to be free to perform other tasks. Pattern matching logic 232 performs a pattern matching analysis on the received frame to enable selective acceptance of the frame in accordance with a pattern matching result. Pattern matching is performed under control of values (e.g., control bits or fields) stored in pattern matching (PM) registers 233. Hashing logic 238 performs a hashing analysis on the address of the received frame to enable selective acceptance of the frame in accordance with a hash hit or miss result to further increase the likelihood of performing full address compares on addresses with a high probability of acceptance.

Figure 5:
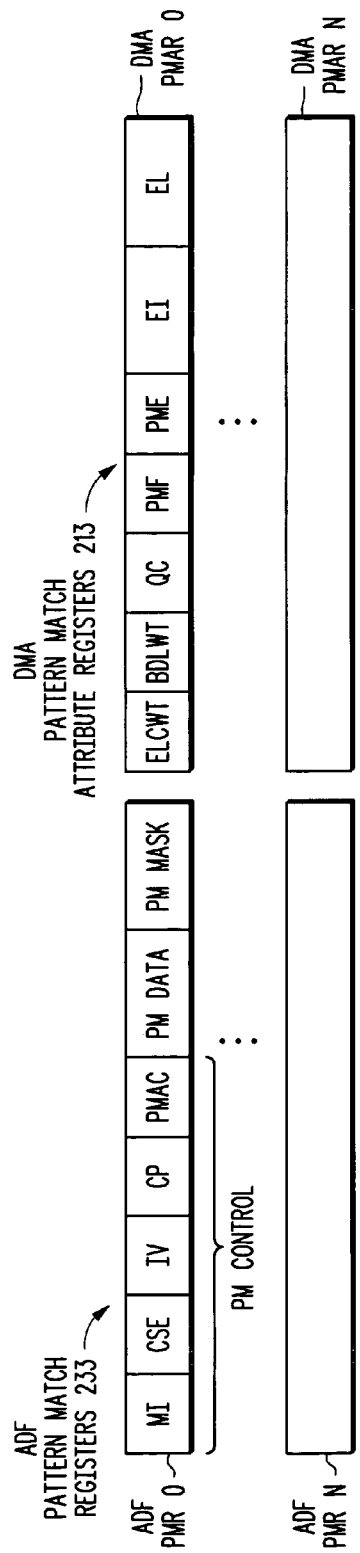
FIG. 5 is a block diagram illustrating exemplary pattern match and pattern match attribute registers of FIG. 1.

PM registers 233 of pattern matching logic 232 include 16 entries. Each entry includes five 32-bit registers. Referring to FIG. 5, each entry includes a pattern (PM DATA), a pattern mask (PM MASK) and a pattern matching control (PM CONTROL) field. The pattern matching control field includes a matching index (MI) field, a continuous search enable (CSE) field, an invert (IV) field, a concatenate pattern (CP) field, and a pattern match acceptance control (PMAC) field.

The PM DATA field includes a bit pattern for comparing with the received frame. If the PM DATA bit pattern (e.g., a 4 byte pattern) is found in the frame, a pattern match is detected. If the PM DATA bit pattern is not found in the frame, a pattern match is not detected. The PM DATA field is 32 bits long in the illustrated embodiment. The PM MASK field includes bits which cause certain bits in a pattern to be masked when the comparison is occurring. For example, vendor identification bits within a portion of the frame may be ignored when PM MASK is set appropriately.

The matching index (MI) field indicates how deep in the received frame pattern matching should start for the corresponding PM DATA. For example, the MI field may include 6 bits indicating a search start range from 0-256 bits. In one embodiment, MI specifies the index, in multiples of 4-bytes, from the start of the receive frame (from DA field to FCS inclusive) from which to perform pattern matching. If MI is cleared, the first 4-bytes of the destination address provide the starting point for pattern matching. The maximum programmed value for MI is 63 (252-byte offset) in the presently discussed embodiment. The MI value for each 4-byte pattern is honored even when allowing for contiguous or non-contiguous patterns.

The continuous search enable (CSE) field affects the type of action to be taken when a match is found. Specifically, the CSE bit indicates whether action should be taken immediately upon a pattern match or whether further pattern match searching should occur upon the pattern match. A set CSE bit indicates that if a match occurs on an entry, the pattern matching should continue. For example, if a pattern match is found and continuous searching is enabled, pattern matching logic 232 continues to search for other matches of PM DATA from other registers of PM registers 233 up until the 256-byte maximum. If no other matches are encountered, the attributes corresponding to the last matched entry are used. All continued patterns must not reject for a final acceptance based on pattern matching. For example, the first pattern match must at least conditionally accept, and all subsequent patterns must either accept, or neither accept nor reject in order to accept the frame. If a subsequent pattern match reject occurs, the value of CSE is ignored, the frame is rejected, and searching is discontinued. If a pattern match is found and continuous searching is disabled (CSE=0), searching for all other patterns is discontinued by pattern matching logic 232, and the frame is accepted or rejected or another determination is made based on the fact that the particular pattern match occurred.

The concatenated pattern (CP) field allows a comparison of more than the 32 bits of PM DATA available in each entry of PM registers 233. If the CP bit is set, the immediate PM registers 233 that follow the current PM register are regarded as a continuation of this pattern, and the next PM DATA entry is concatenated to the current PM DATA entry. In this case, each PM DATA entry must be found in the frame for a pattern match to occur, but the two sets of matching bits can be anywhere within the frame according to their respective MI. If the CP bit is not set, no pattern concatenation occurs. The CP field of the last PM register 233 is regarded as cleared, regardless of the value stored therein. The lowest numerical PM register 233 in which CP is set contains the pattern matching control and attribute information (except MI) that is used for concatenated patterns. For each concatenated pattern, the MI field must be set to the appropriate 4-byte multiple lest all the patterns attempt to match to the first 4-bytes of the frame (if MI is left cleared).

The invert (IV) field allows comparison of the pattern to the frame in true or complement form. For example, when invert is not set (IV=0), a pattern match occurs only when a data match occurs (e.g., PM DATA is found in the received frame). When invert is set (IV=1), a pattern match occurs only when a data match does not occur (e.g., PM DATA is not found in the received frame).

The PMAC field controls the filtering of frames based on pattern matching. PMAC stores two bits which indicate (i) whether pattern matching for the corresponding pattern is enabled, and (ii) if pattern matching is enabled for the corresponding pattern, the effect of the pattern matching once completed. For example, if the PMAC field is 00, then pattern matching for the particular entry is disabled, no pattern matching occurs for the corresponding pattern, and pattern matching logic 232 is free to move on to the next pattern in the next PM register 233. If the PMAC field is not 00, then pattern matching is enabled. If the PMAC field is 11, then the frame is rejected upon a pattern match. If the PMAC field is 10, then the frame is either accepted absolutely if continuous search is disabled (CSE=0), or accepted conditionally if continuous search is enabled (CSE=1). If the PMAC field is 01, then the frame is neither accepted nor rejected. In this case, the pattern is not the criteria used for accepting or rejecting a frame if a match occurs, and information is gathered for post processing regarding the pattern match result, but no decision is made to accept or reject the frame based on the information gathered. The post processing may include filing or extracting data on a frame that is accepted based on a previous pattern or based on destination address recognition, or can include other classification functionality. The frame can be accepted later by a hash process, another pattern matching process, or the like.

Referring again to FIG. 2, DMA 210 includes receive buffer 211, extraction engine 212, pattern attribute registers 213, buffer descriptor and filing processor (BDFP) 214, status register 215, and buffer descriptor address registers 216. The logical blocks discussed herein are exemplary, and different embodiments may have a different logical partitions of functionality. For example, in one embodiment, DMA 210 may be envisioned as including a memory controller for performing extraction, buffer descriptor processing and filing processing.

Receive buffer 211 is coupled to receive message frames from receive FIFO 220. Status register 215 is coupled to receive pattern status (PS) information from receive FIFO 220. Pattern status includes a pattern number (e.g., PM register number) and a corresponding pattern hit indication. FIFO controller 222 is coupled to DMA 210 to control the transfer of such information. Receive buffer 211 is coupled to provide frame data to bus interface unit 170 via connection 172.

Extraction engine 212 is coupled to provide extraction control information to receive buffer 211 to indicate which frame information is to be extracted for forwarding to cache 120. Extraction engine 212 is coupled to provide attributes regarding the extracted information to bus interface unit 170 via connection 172. For example, extraction engine 212 indicates whether the data sent by receive FIFO to memory and/or cache is extracted or normal and whether it is to be stored in memory 130 or both stored in memory 130 and stashed in cache 120 and any priority information associated with the data. Status register 215 provides pattern status information to extraction engine 212 to indicate which frame data should be extracted. Extraction engine 212 is also coupled to receive extraction control information from pattern attribute registers 213. For example, pattern attribute registers 213 provide an extraction index and extraction length to extraction engine 212 (discussed below).

Pattern attribute registers 213 are coupled to provide filing information indicative of which buffer queue in which to file the frame data (PMF) to buffer descriptor address registers 216. Status register 215 is coupled to provide pattern match information such as an indication of the actual pattern matched to BDFP 214. Buffer descriptor address registers 216 are coupled to provide a base address for each buffer descriptor queue (BDQs 410, 420, 430 and 440), and each queue pointer (BDQ_BASE, BDQ_CURRENT and BDQ_NEXT), and the default queue to BDFP 214. BDFP 214 is coupled to provide address and data information to bus interface unit 170 via connection 172.

Pattern attribute registers are written by the user to specify action upon a match occurrence, where to file frame information, when to extract frame information and how to store receive frames and their associated buffer descriptors. A total of 16 registers or entries are supported in the presently discussed embodiments. One such register (or an alternate register) may be designated as a default register and include information to specify an action when no pattern match occurs. Referring to FIG. 5, each entry includes an extracted cache (e.g., L2 cache) write type (ELCWT), a buffer descriptor cache write type (BDLWT), a queue classification (QC), a pattern match file (PMF), a pattern match extract (PME), an extracted index (EI) and an extracted length (EL). Other bit fields may be included to enable or support any number of other functions. For example, data snoop bits may be included to support snooping of received frames to memory or snooping of received buffer data memory accesses. In this case, when there is an access to memory, the cache can snoop a read or write access to the memory so that the cache can detect the address and then take appropriate action such as invalidating copies of the data stored in the cache, updating the cache data from the memory, or storing the data in the cache substantially in parallel with storing the data in the memory. Pattern attribute registers are exemplary memory locations for the informational content discussed. Other embodiments may include other configurations for storing such informational content, including other bit configurations, distributed register locations, etc.

The extracted cache write type (ELCWT) field specifies the write transaction type to perform for extracted data. An extraction write transaction occurs if the pattern matching extract (PME) field is set, a corresponding pattern match occurs, and the extract length (EL) field is non-zero. In one embodiment, if ELCWT is 00, then no allocation is performed; if ELCWT is 01, no extraction occurs; if ELCWT is 10, then a cache line is allocated; and if ELCWT is 11, then the cache line is allocated and locked. In the case of concatenated pattern configurations, the ELCWT used is from the lowest numerical pattern attribute register. Writes to cache are performed with snoop.

The buffer descriptor cache write type (BDLWT) field specifies the write transaction type to perform for the buffer descriptor for a receive frame. This occurs if a pattern match occurs, regardless of the value of PMF or PME. Writes to cache are performed with snoop. In one embodiment, if BDLWT is 00, then no allocation is performed; if BDLWT is 10, then a cache line is allocated; and if BDLWT is 11, then the cache line is allocated and locked.

The pattern match extract (PME) field indicates whether pattern match-based extraction is enabled. If the pattern match extract bit is set (PME=1), extraction is enabled. If the pattern match extract bit is not set (PME=0), extraction is disabled.

The queue classification (QC) specifies the receive queue classification in which to file an incoming frame if the PMF field is set and a corresponding pattern match occurs. In the case of concatenated pattern configurations the QC used is from the first 4-byte pattern. If QC is 00, queue #0 is used, and the buffer descriptors starting at the address pointed to by BDQ0_BASE is used. If QC is 01, queue #1 is used, and the buffer descriptors starting at the address pointed to by BDQ1_BASE is used. If QC is 10, queue #2 is used, and the buffer descriptors starting at the address pointed to by BDQ2_BASE is used. If QC is 11, queues #3 is used, and the buffer descriptors starting at the address pointed to by BDQ3_BASE is used.

The pattern match file (PMF) indicates whether the QC field is used to determine where the frame is filed in memory 130. For example, if PMF=0 and a match occurs, the QC field in a default attribute register is used to determine where the frame is filed. If PMF=1 and a match occurs, the QC field in the register corresponding to the matched pattern is used to determine where the frame is filed.

The pattern attribute registers 213 are also written by the user to specify the extract index and extract length to be used if a pattern match occurs and the pattern match extract (PME) bit in registers 213 is set. The extracted index (EI) points to the first byte within the receive frame from which to begin extracting data. The DMA controller 210 uses this field to perform extraction if the pattern match extract field (PME=1) is set and a corresponding pattern match occurs. In the case of concatenated pattern configurations (CP=1), the EI used is from the lowest numerical register (e.g., the first register in the concatenated chain). The extracted length (EL) field specifies the number of bytes to extract from the received frame. The DMA Controller 210 uses this field to perform extraction if the pattern match extract field (PME=1) is set for the corresponding pattern match. In the case of concatenated pattern configurations, the EL from the lowest numerical pattern attribute register is used. If EL is zero, no extraction takes place.

Figure 4:
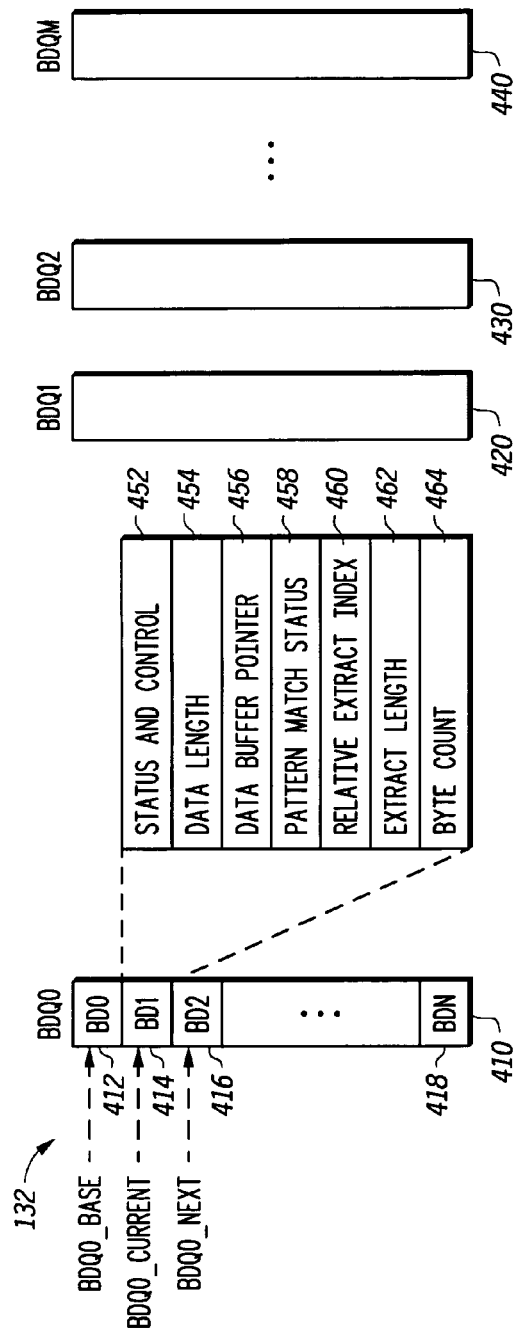
FIG. 4 is a block diagram illustrating exemplary buffer descriptor queues of FIG. 1.

FIG. 4 is a block diagram illustrating multiple exemplary buffer descriptor queues BDQ0, BDQ1, BDQ2 through BDQM. Each buffer descriptor queue includes several buffer descriptors such as the storage locations shown for BDQ0: BD0 412, BD1 414, BD2 416 through BDN 418. Each buffer descriptor queue has a ring structure and is accessed via three pointers: BDQ_BASE, BDQ_CURRENT, and BDQ_NEXT. Each buffer descriptor storage location stores information regarding received frame information stored in memory 130 and/or cache 120. For example, such information includes status and control 452, data length 454, data buffer pointer 456, pattern match status 458, relative extract index 460, extract length 462 and byte count 464. Each buffer descriptor queue can represent a different priority for a corresponding frame. As shown in FIG. 1, the buffer descriptor queues are stored in memory 130, and sometimes also stored in cache 120 if BDLWT is appropriately set. The buffer descriptor queues may be stored with or without a corresponding extraction of frame data occurring.

Figure 6:
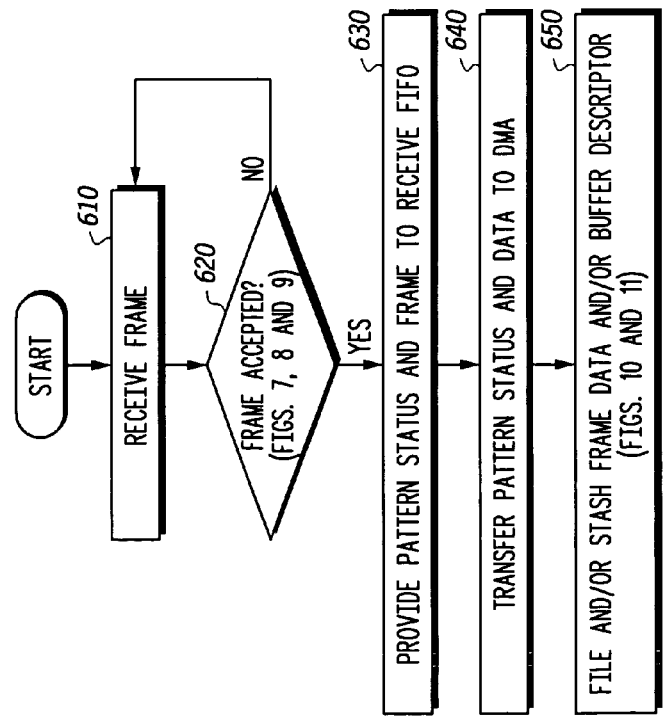
FIG. 6 is a flow chart illustrating a method for processing received messages by the system of FIG. 1.

FIG. 6 is a flow chart illustrating an exemplary operational flow of system 100. Once a frame is received during operation 610, ADF 230 determines whether a frame should be accepted during decision 620. The process for accepting a frame is further discussed herein with reference at least to FIGS. 7-9. If the frame is not accepted during decision 620, ADF 230 awaits further frames at operation 610. If the frame is accepted during decision 620, the frame and pattern status are provided from temporary queue 234 to receive FIFO 220 during operation 630. After the frame and pattern status are passed to receive FIFO 220, the pattern status and frame data are provided to DMA 210 during operation 640. Once the pattern has been forwarded to DMA 210, DMA 210 can store the frame data in memory during operation 650. Also during operation 650, any data which matches an enabled pattern in pattern match registers 233 is extracted and stashed in cache 120. The process for storing frame data and stashing extracted frame data is further discussed herein with reference at least to FIGS. 10 and 11.

Figure 3:
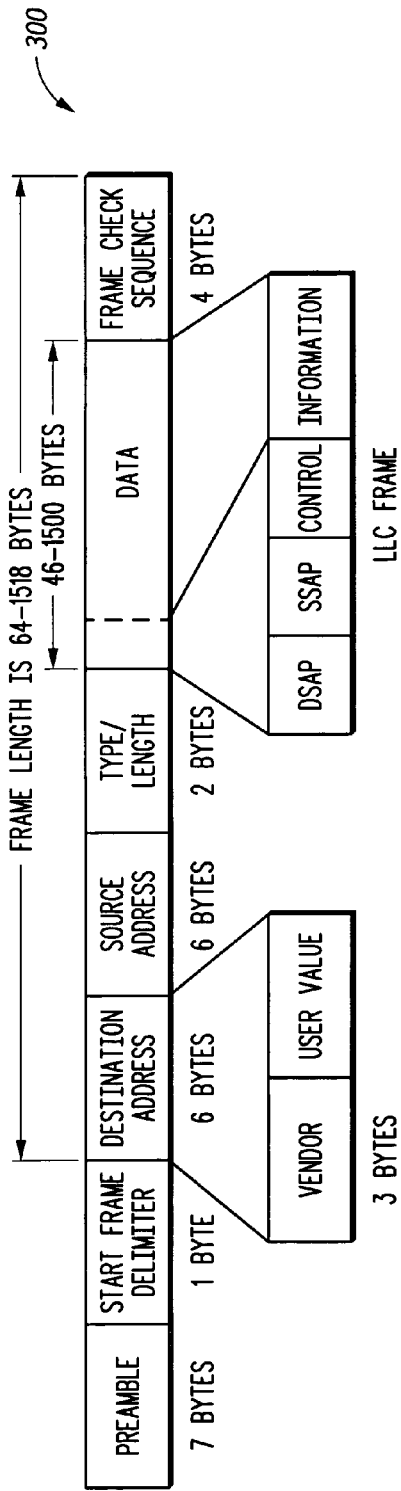
FIG. 3 is a block diagram illustrating an exemplary message address format receivable and parsable by system of FIG. 1.

FIG. 3 illustrates an exemplary message packet with a frame receivable by address/data filter 230 during receive frame operation 610. The illustrated format is compatible with Ethernet/IEEE 802.3 standard messages. Message 300 includes a preamble, a start frame delimiter (SFD) and the frame. The preamble and start frame delimiter provide set up information to aid the system in receiving and processing the frame. The preamble is a 7 byte field of alternating ones and zeros used for receiver timing synchronization. For example, each byte contains the value 0x55. The start frame delimiter indicates the beginning of the frame. An exemplary value for the start frame delimiter is a sequence of 0xD5 (10101011 binary because the bit ordering is least significant bit first). The illustrated frame has a length from 64-1518 bytes, and includes a 6 byte destination address (DA), a 6 byte source address, a 2 byte type/length field, a 46-1500 byte logic link control (LLC) frame, and a 4 byte frame check sequence.

The destination address of the frame includes a 3 byte vendor field and a 3 byte user value. The first bit of the user value identifies the address as an individual address (0) or a group address (1). The second bit indicates whether the address is locally-defined (1) or globally-defined (0). As illustrated, the source and destination addresses include 48 bits. Other embodiments may use different address lengths such as 16 bit addresses in earlier versions of the IEEE 802.3 specification.

The type/length field corresponds to an Ethernet type field and/or an IEEE 802.3 length field. The type field signifies the protocol (e.g., TCP/IP) used in the rest of the frame. The length field specifies the length of the data portion of the frame. Generally, the length field is unique from any type fields used in Ethernet to facilitate use of both Ethernet and IEEE 802.3 frames on the same network. The type field is identified by a decimal number equal to or greater than 1536 (0x0600) but less than 65535 (0xFFFF). If the number is between 0 and 1,500 (0x0000 through 0x05DC) then this field indicates the length of the MAC client data. In the illustrated embodiment, the range from 1,501 to 1,536 (0x5DD through 0x5ff) is undefined.

The logical link control (LLC) is responsible for providing services to the network layer regardless of media type, such as FDDI, Ethernet, token ring, and others. The LLC layer makes use of LLC protocol data units (PDUs) in order to communicate between the media access control (MAC) layer and the upper layers of the protocol stack. Three variables determine access into the upper layers via the LLC-PDU. The variables include the destination service access point (DSAP), the source service access point (SSAP), and a control variable. The DSAP address specifies a unique identifier within the station providing protocol information for the upper layer. The SSAP provides the same information for the source address.

The LLC frame includes a preamble and an information field. The preamble includes the DSAP field, the SSAP field and the control field. The information field includes data and optional padding. Padding is generally only needed if the data is smaller than 46 octets/bytes to ensure the minimum frame size of 64 octets as specified in the IEEE 802.3 standard. In 802.3x the first two octets of the data field are used as opcode (OP) (pause=0x000) and the second two octets are used to transmit a pause time (PT) parameter (pausetime=0x0000 for on and 0xFFFF for off). In addition, a third two-octet field can be used for an extended pause control parameter (PTE). In place of the LLC, Ethernet frames can use different protocols with similar fields. Because the use of these fields varies with the protocol used, the ability to examine them and report their content can significantly accelerate Ethernet frame processing, and such ability may be enhanced by using pattern matching.

The frame-check sequence (FCS) specifies the standard 32-bit cyclic redundancy check (CRC) obtained using the standard CCITT-CRC polynomial on all fields except the preamble, SFD and CRC.

Figure 7:
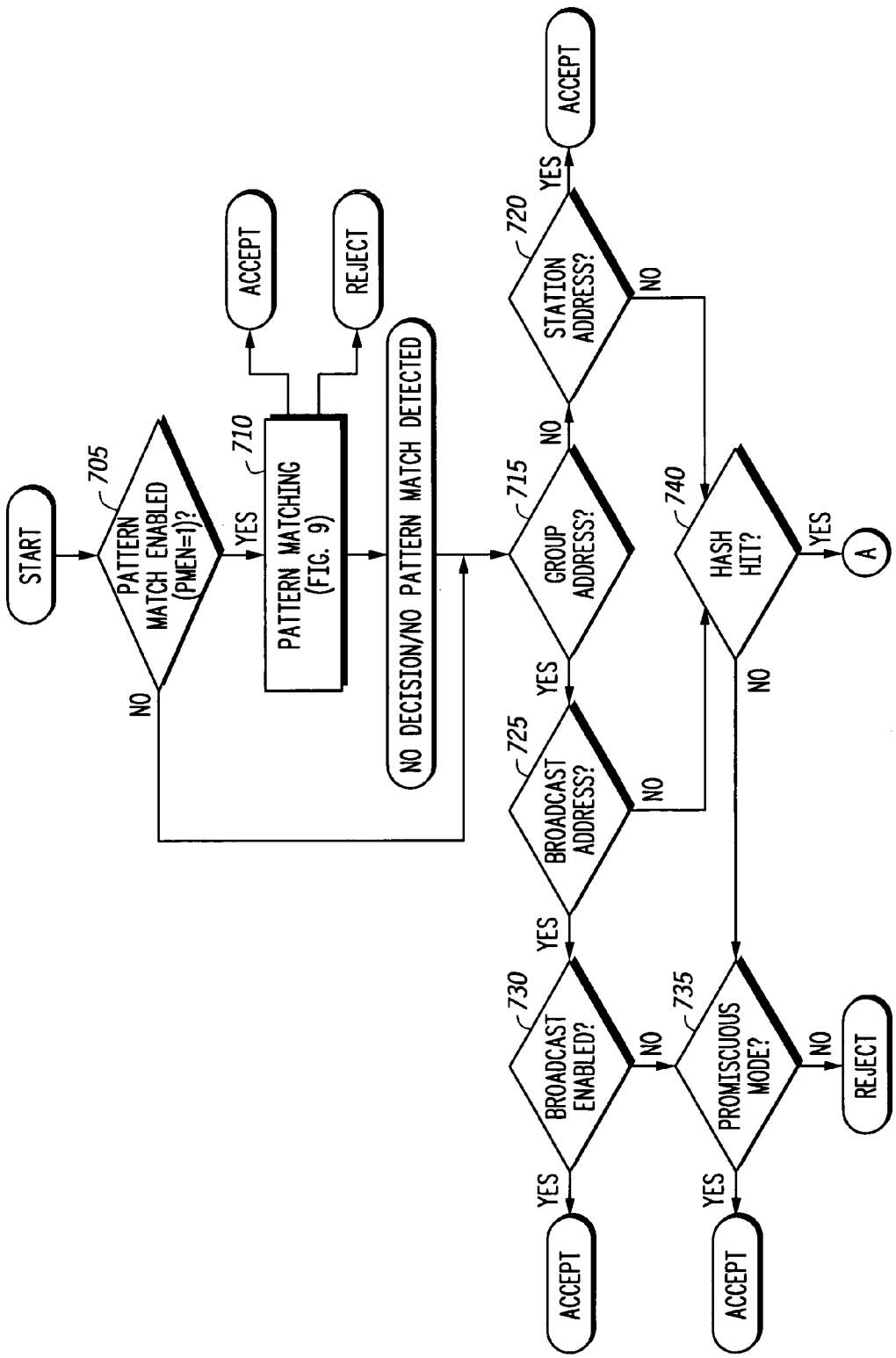
FIG. 7 is a flow chart illustrating a portion of a method for hashing and pattern matching message addresses received by the system of FIG. 1.
Figure 8:
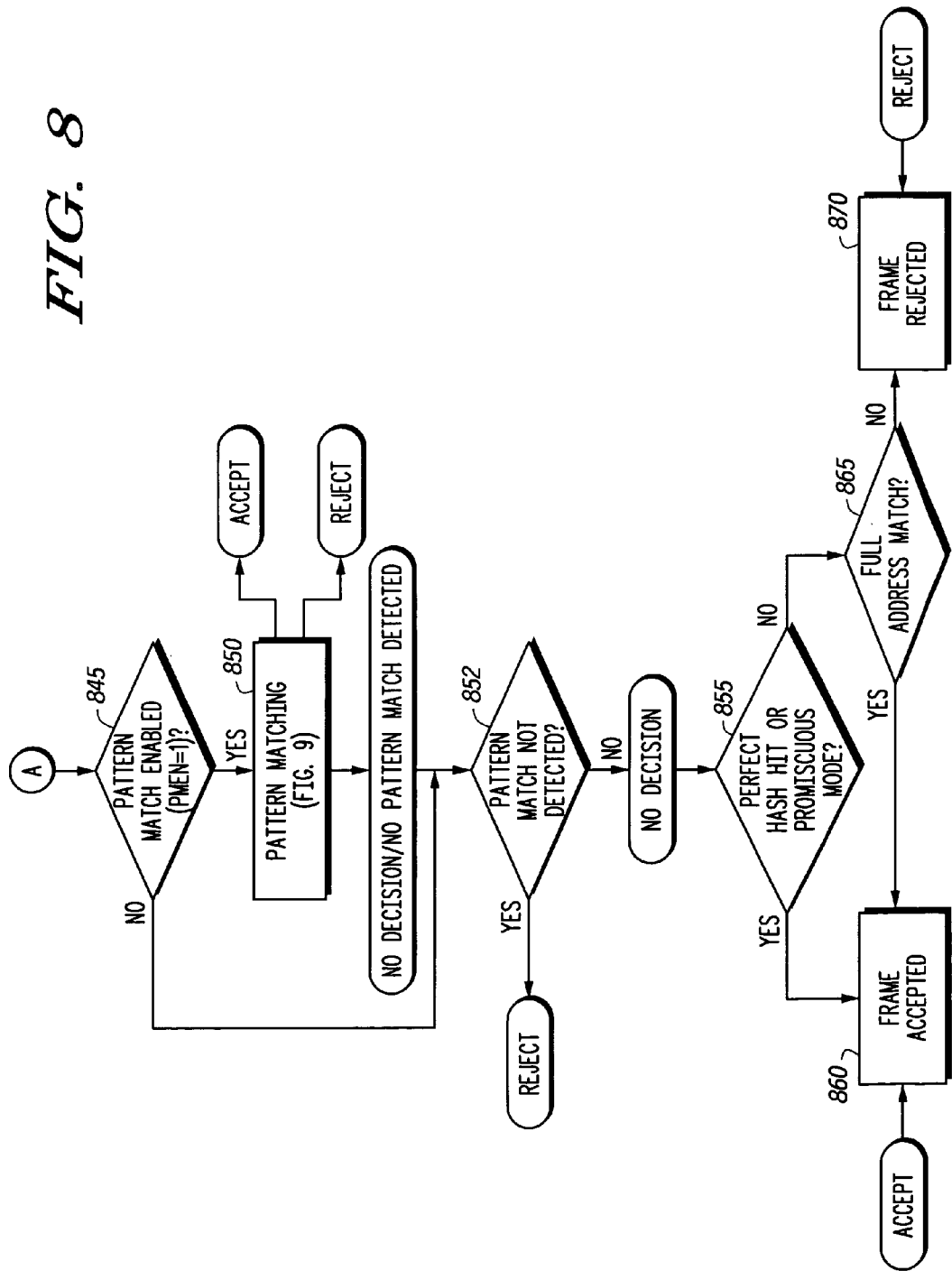
FIG. 8 is a flow chart illustrating another portion of a method for hashing and pattern matching message addresses received by the system of FIG. 1.

FIGS. 7 and 8 are flow charts illustrating a method for hash filtering of messages using pattern matching. Referring to FIG. 7, after an incoming frame is received at temporary queue 234 during operation 610, pattern matching logic 232 accesses PM registers 233 and selects the various entries in succession to determine if a pattern stored in PM registers 233 is contained in frame information in temporary queue 234.

For example, ADF 230 checks an ADF global control register including a pattern match enable bit (PMEN) to determine if pattern matching is enabled. If pattern matching is not enabled (PMEN=0), flow proceeds to group address decision 715. If pattern matching is enabled (PMEN is nonzero), a pattern matching process 710 is initiated. If pattern matching process 710 results in the frame being accepted or rejected (as described in further detail below with reference to FIG. 9), flow proceeds from block 710 through a respective one of the illustrated "accept" or "reject" flow chart nodes to a respective one of accept frame operation 860 or reject frame operation 870 of FIG. 8. If pattern matching process 710 does not result in a frame acceptance or rejection decision being made, flow proceeds from pattern matching process 710 through the illustrated "no decision/no pattern match detected" node to the aforementioned group address decision 715.

During group address decision 715, receive portion 180 determines whether the address in the received frame is a group address. In the presently discussed embodiment, the first bit of the user value of the frame identifies the address as an individual address (0) or a group address (1). If the address is not a group address, flow proceeds to station address decision 720. If the address is a group address, flow proceeds to broadcast address decision 725.

During station address decision 720, receive portion 180 determines whether the address in the received frame is a station address by performing an exact 48 bit compare with frame data. If the address is determined to be a station address, flow proceeds from block 720 through the illustrated "accept" flow chart node to accept frame operation 860 in FIG. 8, and the frame is accepted at accept frame operation 860. If the address is not determined to be a station address, flow proceeds to hash hit decision 740.

During broadcast decision 725, receive portion 180 determines whether the address in the received frame is a broadcast address. An exemplary broadcast address is an address of 0xFFFFFF-FFFFFF. If the address is determined to be a broadcast address, flow proceeds to broadcast enabled decision 730. If the address is not determined to be a broadcast address, flow proceeds to the aforementioned hash hit decision 740.

During broadcast enabled decision 730, receive portion 180 determines whether the broadcast functionality is enabled. Broadcast functionality is enabled when an ADF global control register bit BC_REJ is reset. If the broadcast functionality is enabled, flow proceeds from block 730 through the illustrated "accept" flow chart node to accept frame operation 860 in FIG. 8, and the frame is accepted at accept frame operation 860. If broadcast functionality is not enabled, flow proceeds to promiscuous mode decision 735.

During promiscuous mode decision 735, receive portion 180 determines whether promiscuous mode is enabled. Promiscuous mode is enabled when an ADF global control register promiscuous bit is set (PROM=1). When receive portion is in promiscuous mode, all frames are accepted which have not been rejected by pattern matching. Generally, promiscuous mode is used for testing and is rarely used. If promiscuous mode is enabled, flow proceeds from block 735 through the illustrated "accept" flow chart node to accept frame operation 860 in FIG. 8, and the frame is accepted at accept frame operation 860. If promiscuous mode is disabled, flow proceeds from block 735 through the illustrated "reject" flow chart node to reject frame operation 870 in FIG. 8, and the frame is rejected at reject frame operation 870.

Because pattern matching may be performed at operation 710 prior to or in parallel with promiscuous mode decision 735 (or otherwise prior to acceptance as a result of promiscuous mode decision 735), a discriminating promiscuous mode may be used in which frames from all addresses are accepted except for one or more specific frames which contain a pattern which causes rejection of the frame. For example, specific addresses may be rejected with the aid of the pattern matching while all other addresses are accepted.

During hash hit decision 740, receive portion 180 determines if a hash hit on the frame destination address has occurred. The 48-bit destination address is mapped into one of 256 bins (or more in other embodiments) by using a portion of a 32-bit cyclic redundancy check (CRC) checksum. See, for example, FIG. 12 which illustrates a number of CRCs 1224 which have been generated for a number of corresponding addresses 1222. Each hexadecimal CRC 1224 of each of lines 1201-1210 corresponds to the 6-byte hexadecimal destination address of the same line.

During setup of system 100, the bits of a CRC checksum are used to index into a hash table. In one embodiment, eight bits are used to index a 256 bin table. The higher order 3 bits of the 8-bit field are used to select one of the 8 hash bucket registers in an individual hash table and/or a group hash table. The lower order 5-bit field selects a bit within the selected 32-bit register. The same checksum is used when the controller receives a frame. If the CRC checksum of the incoming address selects a bit that is set in the group/individual hash table, a hash hit has occurred. Otherwise, no hash hit has occurred.

In the illustrated embodiment, the first 8 bits of the CRC select a bit in the hash table. The addresses in lines 1201-1203 and 1206 are to be received by the system and have therefore been used to set up the hash table. In line 1201, the hexadecimal value 0x04 maps to hash bucket bin 4. In line 1202, the hexadecimal value 0x0F maps to hash bucket bin 15. In line 1203, the hexadecimal value 0x15 maps to hash bucket bin 21. In line 1206, the hexadecimal value 0xCB maps to hash bucket bin 203. Thus, addresses which have CRCs which select any of bucket bins 4, 15, 21 and 203 will be hash hits when such addresses are received.

The effectiveness of the hash table can decline as the number of addresses increases. For example, as the number of addresses stored in the 256-bin hash table increases, the vast majority of the hash table bits are set, preventing a significantly smaller fraction of unintended frames from reaching memory. One advantage of hash filtering is that the speed of the hashing does not depend on the number of addresses in the destination address list. It should also be noted that a hashing-alone protocol, without pattern matching, cannot be used to reject frames that match a set of selected addresses because unintended addresses can map to the same bit in the hash table resulting in the rejection of frames that should have been received. Thus, hash filtering alone results in imperfect filtering which requires post-filtering of the frames that reach memory. This may be illustrated by an example below with reference to the received destination addresses shown in FIG. 12.

During hash hit decision 740, a CRC for each received address is used to select a hash bucket bin. If the selected bin indicates a hit, then a hash hit has occurred. For example, when any of addresses 1201-1203 and 1206-1210 are received, one of bins 4, 15, 21 and 203 is selected, and a hash hit has occurred. Accordingly, when address 1204 or address 1205 are received, none of bins 4, 15, 21 and 203 is selected, and a hash hit has not occurred. The frame is typically rejected when a hash hit has not occurred. In this way, addresses 1204 and 1205 may be rejected. However, addresses 1207-1210 of FIG. 12 generated hash hits, but are not addresses intended for receipt and acceptance by system 100. Therefore, another means of filtering must be employed.

System 100 uses pattern matching to further filter the incoming addresses so that the need for processor/software-based post-filtering is minimized or even eliminated. For example, a pattern may be stored in a PM register so that addresses cause misleading hash hits may be rejected. In the illustrated embodiment, addresses can be rejected if they are not intended for a particular vendor ID (first 24 bits of destination address). A pattern of 0x0050FC04 has been stored as PM DATA in a PM register along with a PM MASK of 0xFFFFFF00. In this way, each address which does not have 0x0050FC in its first 24 bits is rejectable by pattern matching. In this case, addresses 1207-1209 are rejected, but 1210 is not rejected since its vendor ID matches the desired vendor ID.

A further pattern may be stored to improve the process. For example, using 2 patterns, one with PM DATA 0x0050FC04 and a PM MASK of 0xFFFFFFFF, and a second pattern of PM DATA 0x0050FC03-C with a PM MASK of 0xFFFFFFFF may be used. In this way, each address which is a hash hit but which does not have 0x0050FC04 in its first 32 bits and 0x0050FC03-C in its first 36 bits may be effectively ignored through pattern matching and hashing. In this case, addresses 1207-1210 are effectively rejected due to pattern matching and hashing, and only the desired addresses are accepted by system 100.

Thus, received addresses 1201-1210 cause a variety of different results. Addresses 1204 and 1205 cause a hash miss and are therefore not accepted. Addresses 1201-1203 and 1206-1210 cause a hash hit. Addresses 1201-1203 cause a hash hit and a pattern match due to the first pattern being found therein. Addresses 1201-1203 are therefore accepted. Address 1206 causes a hash hit and a pattern match due to the second pattern being found therein. Address 1206 is therefore accepted. Addresses 1207-1210, while causing a hash hit, do not result in a pattern match because the first and second patterns are not found therein. Addresses 1207-1210 are therefore not accepted.

In general, if 32 group addresses are stored in the hash table and random group addresses are received, the hash table prevents a large percentage (e.g., in some instances as high or higher than 85%) of the group address frames from reaching memory. Without the pattern matching of the current disclosure, software operating on system 100 would have to further filter (i.e., post-filter) those that reach memory 130 to determine if they contain correct addresses. In the foregoing example, addresses 1207-1210 would have required further post filtering involving processor 110 without the pattern matching induced rejection conditions being triggered.

Referring to FIG. 8, receive portion 180 determines if pattern matching is enabled for a selected pattern PM DATA in a selected register during pattern match enabled decision 845. If pattern matching is not enabled (PMEN=0), flow proceeds to hash/promiscuous decision 855. If pattern matching is enabled (PMEN=1), a pattern matching process 850 is initiated. If pattern matching process 850 results in the frame being accepted or rejected (as described in further detail below with reference to FIG. 9), flow proceeds from block 850 through a respective one of the illustrated "accept" or "reject" flow chart nodes to a respective one of accept frame operation 860 or reject frame operation 870. If a pattern match occurs during pattern matching process 850 without a frame acceptance or rejection decision being made, or if no pattern matches occur, flow proceeds from pattern matching process 850 through the illustrated "no decision/no pattern match detected" node to pattern match not detected decision 852.

Referring to pattern match not detected decision 852 in the illustrated embodiment presently discussed, if none of the 16 patterns resulted in a pattern match being detected, flow proceeds from decision 852 through the illustrated "reject" flow chart node to reject frame operation 870. In other embodiments, the frame may be retained for further filtering by processor 110. In a variant embodiment, the frame may be given a lower priority than frames for which a pattern was detected so that processor 110 focuses on high confidence frames (with a hash hit and a pattern match) before low confidence frames (with a hash hit but no pattern match). In another variant embodiment, the frames may be stored in different queues corresponding to different processing elements. If at least one of the 16 patterns resulted in a pattern match being detected, flow proceeds from decision 852 through the illustrated "no decision" flow chart node to the aforementioned hash/promiscuous decision 855. The elements of FIGS. 7 and 8 described so far correspond to media access control functionality.

During hash/promiscuous decision 855, data link functionality is implemented when either there has been a pattern match with no decision (e.g., no acceptance and no rejection) or there has been no pattern match. Receive portion 180 (e.g., a state machine in ADF 230) determines whether a perfect hash hit has occurred and/or whether promiscuous mode is enabled. A perfect hash hit occurs when both a hash hit and a pattern match occur that uniquely correspond to only one address. In contrast, a high confidence hash hit occurs when both a hash hit and a pattern match occur which correspond to a low number of addresses but more than one address. A high confidence hash hit provides enhanced performance over traditional address filtering due to the use of pattern matching which enhances the probability that the high confidence address is in fact a sought address. Careful selection of a pattern using system and/or network characteristics can cause a higher probability that a hash hit is perfect. If either a perfect hash hit has occurred or promiscuous mode is enabled, the received frame is accepted at frame accept operation 860. If neither a perfect hash hit has occurred nor promiscuous mode is enabled, flow proceeds to full address match decision 865.

During full address match decision 855, processor 110 determines whether the a full address match has occurred. System 100 performs a direct comparison of the address to the addresses known to system 100. System 100 may store received addresses in a priority queue or the like so that addresses with a higher predicted likelihood of acceptance (high confidence frames) are processed before addresses with a lower predicted likelihood of acceptance (low confidence frames). Such a full and direct comparison is costly in terms of processing resources of system 100. Thus, the pattern matching and hashing described herein seeks to avoid such a costly direct address compare. In this way, system 100 can use pattern matching without a direct address compare as much as possible to enhance the performance of the system, and the full address match is a last resort. If there is a full address match, the received frame is accepted at frame accept operation 860. If there is not a full address match, the received frame is rejected at frame reject operation 870.

Figure 9:
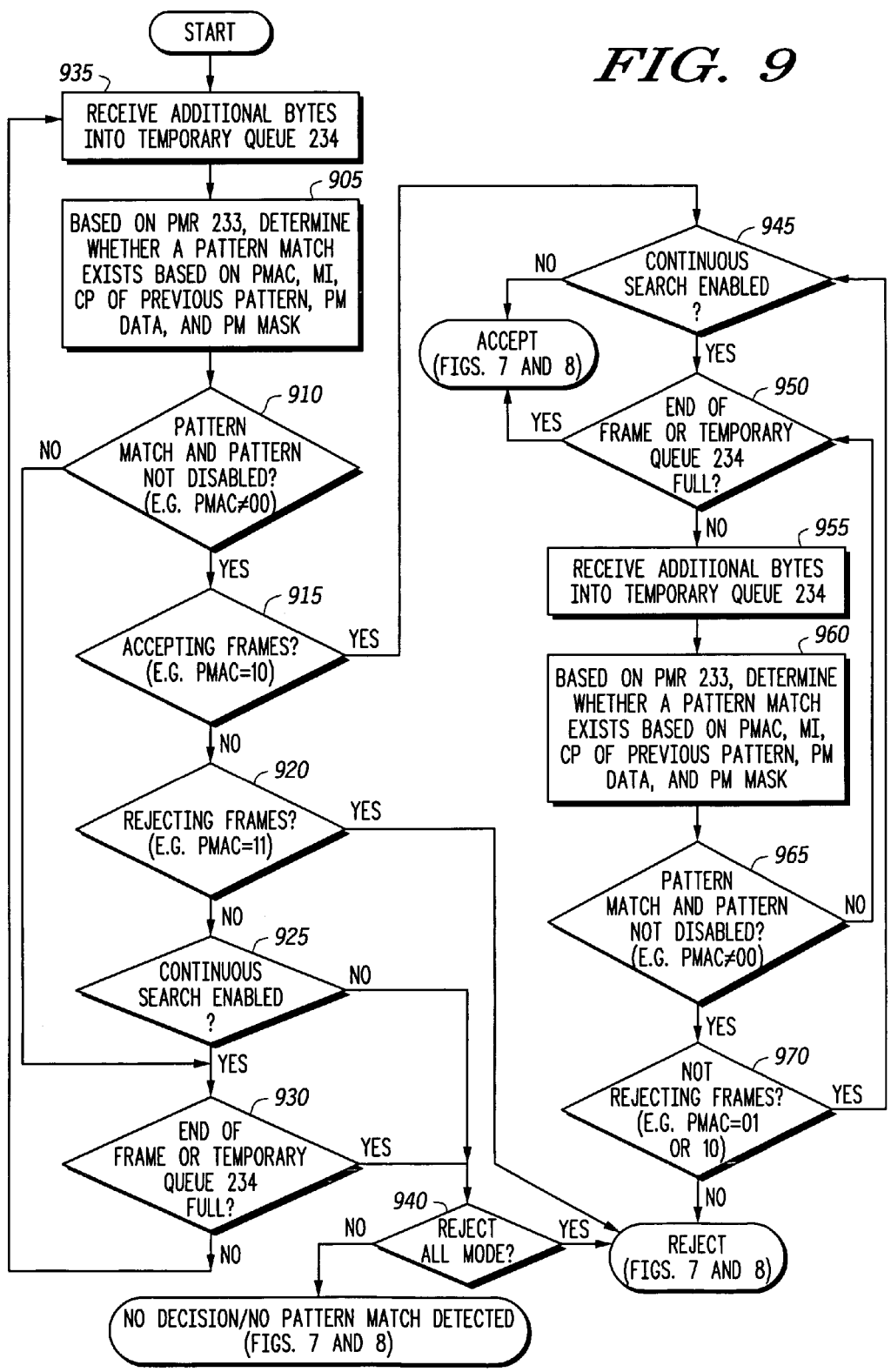
FIG. 9 is a flow chart illustrating a method for pattern matching message addresses received by the system of FIG. 1 within the illustrative flow of FIG. 7.

FIG. 9 is a flow chart illustrating a method for pattern matching message addresses received by system 100. The frame may be accepted or rejected depending on whether a pattern match occurs. Any portion of the message frame may be checked for a match including the IP address. The operations of FIG. 9 are executed, when pattern matching is enabled (PMEN=1), for each pattern for which a corresponding pattern match acceptor indicator permits (e.g., PMAC=1), unless a final disposition (acceptance or rejection) is mandated by one pattern match occurrence prior to another pattern match being attempted. If a pattern data set is enabled, the message data is checked for a pattern match. If a pattern match data set is not enabled, or if a pattern match is not found, a next pattern is selected and the process is repeated. If continuous search is enabled, then searching continues for the next pattern irrespective of a match.

Referring to receive operation 935, bytes of the incoming frame are received into temporary queue 234 for temporary storage until a decision is made whether to accept or reject the incoming frame. Bytes of the incoming frame are also provided to pattern matching logic 232 and address recognition and hash logic 238 so that such a decision may be made while the bytes are being received by temporary queue 234. After bytes have been received during receive operation 935, flow proceeds to pattern match determination operation 905.

Referring to pattern match determination operation 905, pattern matching logic 232 determines if pattern match data stored in PM registers 233 matches data in the received frame. For example, pattern matching logic compares the PM DATA in a first one of PM registers 233 with incoming frame data as it is stored in temporary queue 234. Temporary queue 234 is used to store the frame until a decision is made. A pattern match occurs, for example, if each bit of the PM DATA (up to 4 bytes) matches each bit of the message data located according to the message index MI. Matching may occur up to 256 bytes deep into the frame with an offset of a maximum of 252 bytes. Certain of the PM DATA may be masked by the corresponding PM MASK. For example, each bit of PM DATA may not be checked for a match if a corresponding PM MASK bit is cleared. If the concatenate pattern (CP) field of the previous pattern is set, then a match occurs only if both PM DATA fields (the current PM DATA and the PM DATA of the previous PM register) are found in the frame. The PMAC field determines whether the corresponding PM DATA is enabled, and if it is enabled, a course of action to take upon a match. Operation 905 may be done in parallel with operation 935.

Referring to pattern match decision 905, if pattern matching is disabled (e.g., PMAC=00), flow proceeds to end of frame (EOF) or queue full decision 930. If a pattern match is not found during pattern match determination operation 905, flow also proceeds to EOF or queue full decision 930. If there is a pattern match and pattern matching is not disabled (e.g., PMAC≠00) during decision 910, flow proceeds to accepting frames decision 915.

Referring to EOF/queue full decision 930, if temporary queue 234 is not full and the end of the frame has not yet been received (and the frame has not been rejected), additional bytes continue to be received into temporary queue 234 during receive operation 935, and flow proceeds to pattern match determination operation 905 to initiate pattern matching on the additional received frame information. If either the end of frame has been received or the temporary queue 234 is full, flow proceeds to reject all mode decision 940.

Referring to reject all mode decision 940, if ADF 230 is determined to be in reject all mode, the frame is rejected and operational flow continues as illustrated in either FIG. 7 or 8 depending on which corresponding flow initiated the pattern matching flow illustrated in FIG. 9. If ADF 230 is not in reject all mode, no decision regarding the frame is made, and flow continues as illustrated in FIG. 7 or 8 depending on which flow initiated the pattern matching illustrated in FIG. 9.

Referring to accepting frames decision 915, if ADF 230 is accepting frames for a pattern (e.g., PMAC=10 for a particular PM DATA), then the frame is conditionally accepted, and flow proceeds to continuous search decision 945. If ADF 230 is not accepting frames for the pattern (e.g., PMAC≠10 for a particular PM DATA), then flow proceeds to rejecting frames decision 920.

Referring to rejecting frames decision 920, if ADF 230 is rejecting frames for a pattern (e.g., PMAC=11 for a particular PM DATA), then the incoming frame is rejected because it contains the PM DATA (or otherwise causes a match taking other factors into account such as PM MASK, CP, etc.) associated with a rejecting PMAC value. Flow then continues as illustrated in FIG. 7 or 8 depending on which flow initiated the pattern matching illustrated in FIG. 9. If ADF 230 is not rejecting frames for a pattern (e.g., PMAC≠11 for a particular PM DATA, and in this case PMAC=01), then flow proceeds to continuous search decision 925.

Referring to continuous search decision 925, if continuous search for a pattern is enabled (e.g., CSE=1), flow proceeds to EOF or queue full decision 930. If continuous search is not enabled (e.g., CSE=0) during continuous search decision 925, then no decision on the foregoing pattern match is made, and flow proceeds to reject all mode decision 940.

Referring to continuous search decision 945, if continuous search for a pattern is enabled (e.g., CSE=1), flow proceeds to EOF or queue full decision 950. If continuous search is not enabled (e.g., CSE=0) during continuous search decision 945, then the incoming frame is accepted. The frame is accepted because it contains the PM DATA (or otherwise causes a match taking other factors into account such as PM MASK, CP, etc.) and pattern matching is enabled (PMAC=10) and no further searching need be done (CSE=0). Flow then continues as illustrated in FIG. 7 or 8 depending on which flow initiated the pattern matching illustrated in FIG. 9.

Referring to EOF/queue full decision 950, if either the end of frame has been received or the temporary queue 234 is full, then the incoming frame is accepted. The frame is accepted because a pattern match has occurred, pattern matching is enabled (PMAC=10) and the end of frame has been reached or the temporary queue is full so no further pattern matching is possible. Flow then continues as illustrated in FIG. 7 or 8 depending on which flow initiated the pattern matching illustrated in FIG. 9.

If temporary queue 234 is not full and the end of the frame has not yet been received during EOF/queue full decision 950, additional bytes are received into temporary queue 234 during receive operation 955, and flow proceeds to pattern match determination operation 960 to initiate pattern matching on the additional received frame information for a next pattern (e.g., PM DATA in a next sequential PM register 233). Pattern match determination operation 960 is similar in functionality to operation 905 described above. Operation 955 may be done in parallel with operation 960. After pattern matching operation 960, flow proceeds to pattern match decision 965.

Referring to pattern match decision 965, if pattern matching is disabled (e.g., PMAC=00) for the currently selected pattern (e.g., PM DATA in the currently selected PM register 233), flow proceeds to EOF/queue full decision 950. If a pattern match is not found during pattern match determination operation 965, flow also proceeds to EOF/queue full decision 950. If there is a pattern match and pattern matching is not disabled (e.g., PMAC≠00) during decision 965, then flow proceeds to not rejecting frames decision 970.

Referring to not rejecting frames decision 970, if ADF 230 is not rejecting frames (e.g., PMAC=01 or PMAC=10) for the next pattern (e.g., the corresponding PM DATA), flow proceeds to EOF/queue full decision 950. Otherwise, the incoming frame is rejected since a reject pattern (PMAC=11) has been detected. Flow then continues as illustrated in FIG. 7 or 8 depending on which flow initiated the pattern matching illustrated in FIG. 9.

Figure 10:
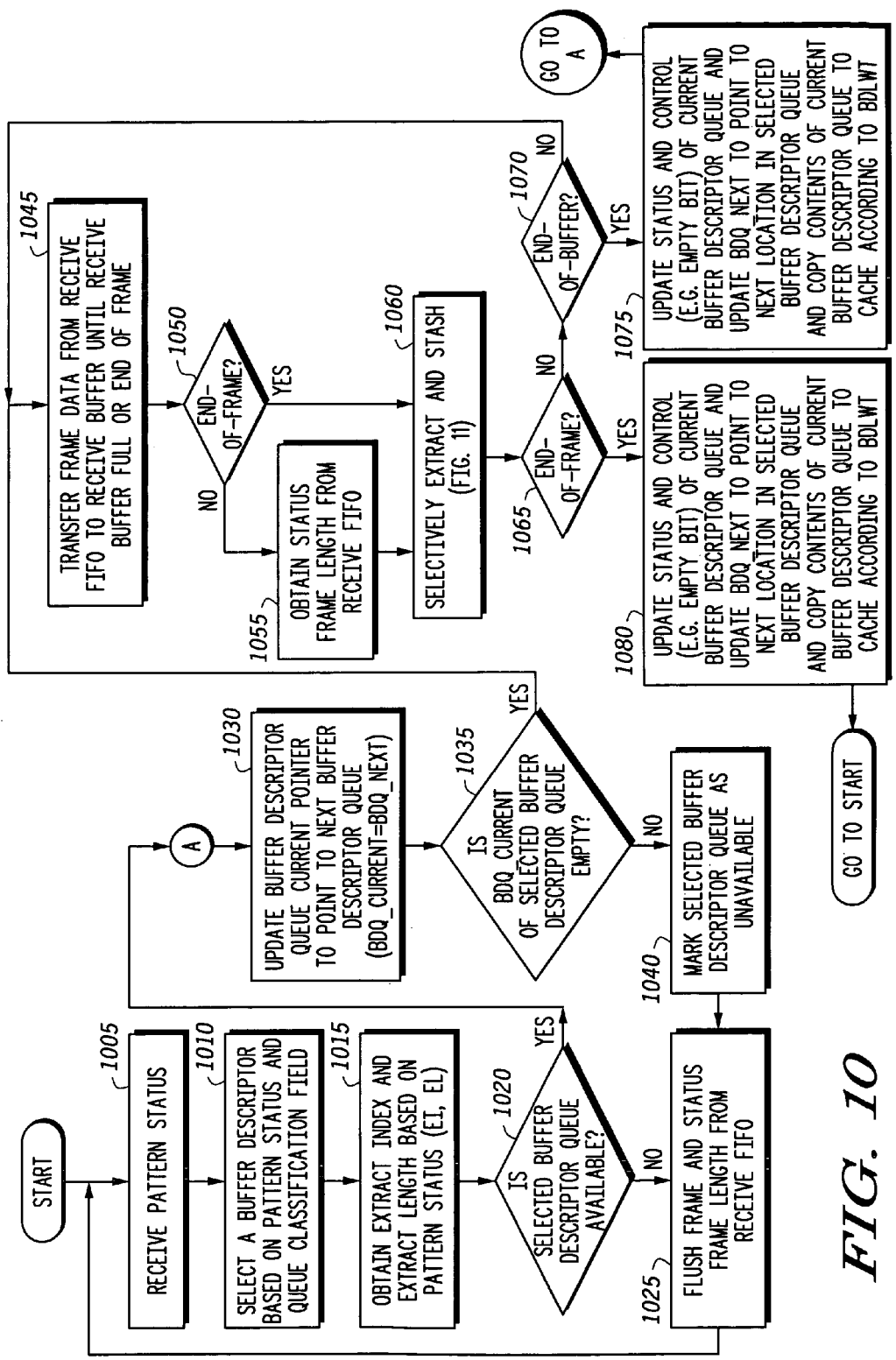
FIG. 10 is a flow chart illustrating a method for processing an accepted message within the system of FIG. 1.

Referring to FIG. 10, a method for processing an accepted message within the system of FIG. 1. One advantage of the illustrated embodiment is that system access to critical data within a packet can be enhanced by detecting it when it is received without resorting to higher level resources, and placing it along with descriptor information in a cache for subsequently faster access.

The illustrated flow is initiated when the pattern status has been provided to DMA 210 and placed into status register 215 during receive pattern status operation 1005. Generally thereafter, the frame data is filed in memory 130 and/or stashed in cache 120 depending on the pattern status information. Filing includes grouping of packets in memory based on packet signature, extraction includes locating a specific portion of a packet (e.g., by using an extraction index and length value), and stashing includes copying extracted data into processor cache space. Extraction can allocate and lock processor cache memory, but software is responsible for unlocking all data in the cache that was locked by the DMA during extraction. Extracted data is not removed from the frame data; rather, all the frame data is stored in memory, and only extract data is copied to the processor cache. Such filing and stashing are described in greater detail below.

Referring to select buffer descriptor operation 1010, BDFP 214 of DMA 210 selects a buffer descriptor based on the pattern status and the queue classification (QC) field in the pattern match attribute registers 213. The QC field determines which buffer descriptor queue 122/132 to use. The pattern status includes a pointer to the appropriate QC field. The pattern status also indicates which pattern match occurred, if any. If a pattern match occurred, the matched pattern may cause data to be extracted from the frame and stashed as extracted data 124 in cache 120. Thus, buffer descriptor queues are chosen 122 in addition to buffer descriptor queues 132. If no pattern match occurred, no extraction would occur, resulting in only buffer descriptor queues 132 being used. After select buffer descriptor operation 1010, flow proceeds to extraction preparation operation 1015.

During extraction preparation operation 1015, extraction engine 212 obtains the extract index (EI) and extract length (EL) from pattern attribute registers 213 if the pattern status indicates a pattern match. After extraction preparation operation 1015, flow proceeds to BDQ available decision 1020.

Referring to BDQ available decision 1020, BDFP 214 determines whether the selected buffer descriptor queue (BDQ) is available. That is, BDFP 214 determines if there is empty space in the selected BDQ. If the selected BDQ is available, flow proceeds through flow chart node "A" to update BDQ pointer operation 1030. If the selected BDQ is not available, flow proceeds to flush operation 1025, whereupon the frame and status frame length are flushed from receive FIFO 220, and flow proceeds to receive pattern status operation 1005.

Referring to update BDQ pointer operation 1030, BDFP 214 updates the buffer descriptor queue current pointer (BDQ_CURRENT) to point to the next buffer descriptor queue (BDQ_CURRENT=BDQ_NEXT). After the current BDQ pointer is updated, flow proceeds to BDQ empty decision 1035.

Referring to BDQ empty decision 1035, BDFP 214 determines if the entry pointed to by BDQ_CURRENT is empty. If the current BDQ entry is not empty, the selected buffer descriptor queue is marked as unavailable during mark unavailable operation 1040, and flow proceeds to flush operation 1025. If the current BDQ entry is empty, flow proceeds to transfer operation 1045.

Referring to transfer operation 1045, BDFP 214 transfers frame data from receive FIFO 220 to receive buffer 211. The transfer proceeds until the end of the frame (EOF) is received or receive buffer 211 is full. After the frame data is transferred, flow proceeds to EOF decision 1050.

Referring to EOF decision 1050, if the end of frame was not received during operation 1045, flow proceeds to selective extract and stash operation 1060. If the end of frame was received during operation 1045, flow proceeds to obtain status frame length operation 1055 during which extraction engine 212 obtains the status frame length from status register 215. After operation 1055, flow proceeds to selective extract and stash operation 1060.

Data is controllably extracted from the received frame for stashing in cache 120 during selective extract and stash operation 1060. Selective extract and stash operation 1060 is more fully described below with reference to FIG. 11. After selective extract and stash operation 1060, flow proceeds to EOF decision 1065.

Referring to EOF decision 1065, if the end of frame was received during selective extract and stash operation 1060, flow proceeds to EOF update operation 1080. If the end of frame was not received during selective extract and stash operation 1060, flow proceeds to end of buffer (EOB) decision 1070.

Referring to EOF update operation 1080, BDFP 214 updates the status and control information of the current buffer descriptor queue. For example, BDFP 214 sets an extraction occurred bit in the current BDQ 122 to indicate that extracted data 124 has been stored in cache 120. The next BDQ pointer (BDQ_NEXT) is set to point to the next location in the selected BDQ. The contents of the current BDQ are copied to the cache according to BDLWT. For example, if a pattern match occurs, and if BDLWT is 00, then no allocation is performed; if BDLWT is 10, then a cache 120 line is allocated; and if BDLWT is 11, then the cache 120 line is allocated and locked. After EOF update operation 1080, flow proceeds to receive pattern status 1005 so that more data may be processed from the next frame.

Referring to EOB decision 1070, if the end of the data buffer 134 in memory 130 was encountered during selective extract and stash operation 1060, flow proceeds to EOB update operation 1075. If the end of the data buffer was not encountered during selective extract and stash operation 1060, flow proceeds to transfer operation 1045 described above.

Referring to EOB update operation 1075, BDFP 214 updates the status and control information of the current buffer descriptor queue. For example, BDFP 214 sets an extraction occurred bit in the current BDQ 122 to indicate that extracted data 124 has been stored in cache 120. The next BDQ pointer (BDQ_NEXT) is set to point to the next location in the selected BDQ. The contents of the current BDQ are copied to the cache according to BDLWT. After EOB update operation 1075, flow proceeds to node A so that more data can be processed from the same frame.

Figure 11:
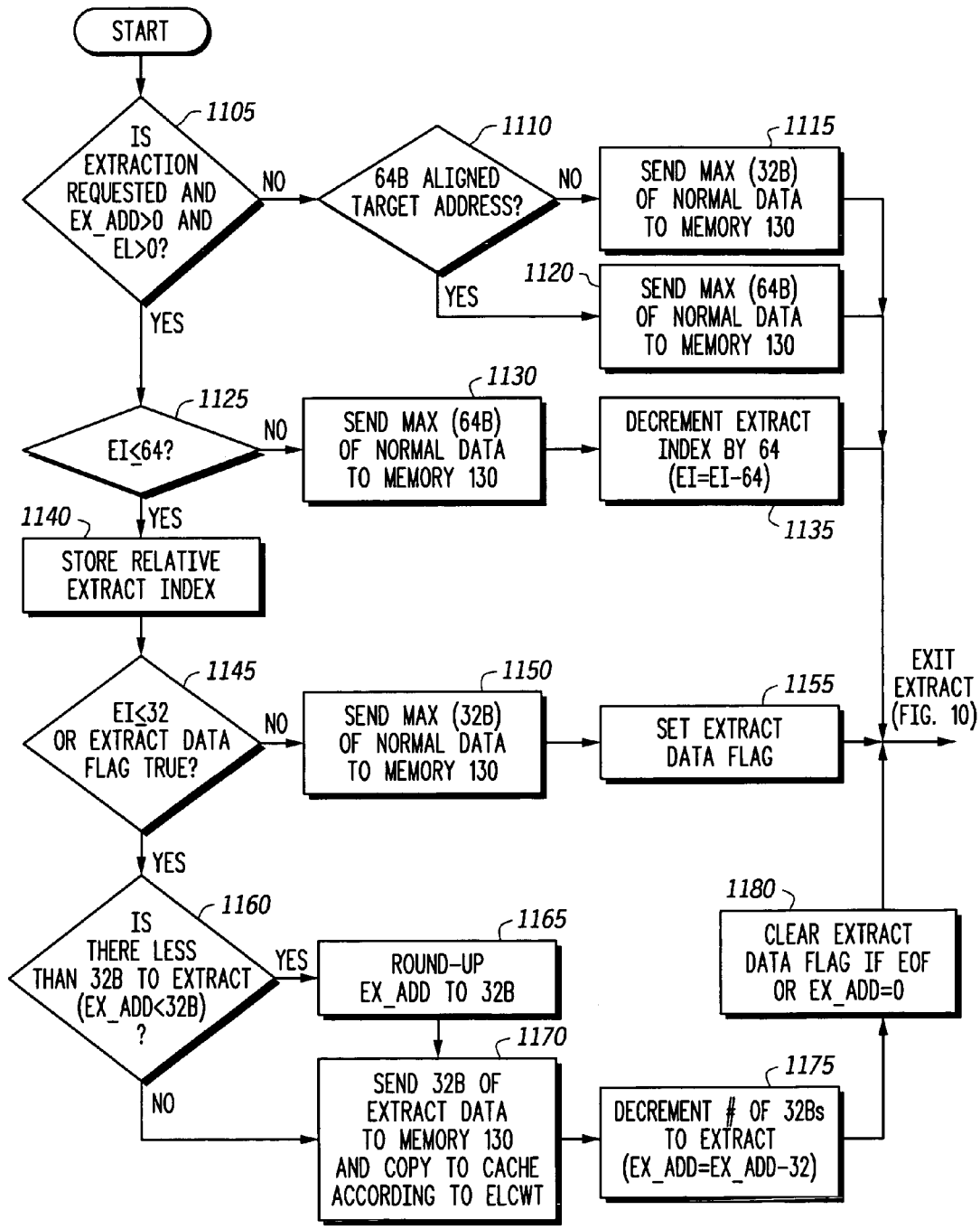
FIG. 11 is a flow chart illustrating a method for extracting and stashing portions of a message by the system of FIG. 1.

FIG. 11 is a flow chart illustrating a method for extracting and stashing portions of a message by the system of FIG. 1 using a 64 byte buffer. The method illustrated in FIG. 11 is called by selective extract and stash operation 1060 of FIG. 10.

Referring to FIG. 11, extraction engine 212 determines if extraction has been requested for a given pattern match during extraction requested decision 1105. Extraction engine 212 also checks various extraction fields such as an extraction add (EX_ADD) field and an extraction length (EL) field. The extraction add field equals the extraction length plus the corresponding extraction index (e.g., EXADD=EL+EI[11:15]). If extraction is requested (PME=1), the extraction add value is greater than zero, and the extraction length is greater than zero, flow proceeds to EI≦64 decision 1125. If extraction is not requested, the extraction add value is zero, or the extraction length is zero, flow proceeds to alignment decision 1110.

Referring to alignment decision 1110, if the target address is not a 64 byte aligned address, flow proceeds to send MAX(32B) operation 1120 where a maximum of 32 bytes of normal data is sent to memory 130. MAX(32B) is a number of bytes up to and including 32 bytes (e.g., where x is a number of bytes, MAX(xB)≦x bytes). If the target address is a 64 byte aligned address, flow proceeds to send MAX(64B) operation 1120 where MAX(64B) of normal data is sent to memory 130. After either of send MAX(32B) operation 1115 or send MAX(64B) operation 1120, the extraction flow exits, and flow proceeds to EOF decision 1065 of FIG. 10.

Referring to EI≦64 decision 1125, if the extract index is greater than 64, the data to be extracted has not yet arrived, and flow proceeds to send MAX(64B) operation 1130 where MAX(64B) of normal data is sent to memory 130. After send MAX(64B) operation 1130, the extract index is decremented by 64 (e.g., EI=EI−64) during decrement EI operation 1135, and the extraction flow exits, and flow proceeds to EOF decision 1065 of FIG. 10.

Referring again to EI≦64 decision 1125, if the extract index is less than or equal to 64, flow proceeds to store relative EI operation 1140. The relative extract index is an index to a location within the data buffer in memory 130 where the extracted data begins. The relative extract index is stored by BDFP 214 internally to DMA 210 until it is later written to the appropriate BDQ in memory 130 and/or cache 120 during operation 1075 or 1080 (FIG. 10). After store relative EI operation 1140, flow proceeds to EI≦32 decision 1145.

Referring to EI≦32 decision 1145, extraction engine 212 performs a comparison with the extraction index and checks an extract data flag which is internally stored in DMA 210, for example, within extraction engine 212. For example, if the extraction index is greater than 32, and the extract data flag is not true, flow proceeds to send MAX(32B) operation 1150 where MAX(32B) of normal data is sent to memory 130. After send MAX(32B) operation 1150, the extract data flag is set true, and the extraction flow exits, and flow proceeds to EOF decision 1065 of FIG. 10.

Referring again to EI≦32 decision 1145, if the extraction index is less than or equal to 32, or the extract data flag is true, flow proceeds to less than 32B decision 1160. If there is at least 32 bytes of data to extract from the received frame (e.g., EX_ADD≧32B), flow proceeds to send 32B operation 1170 where 32 bytes of extract data is sent to memory 130 and copied to cache 120 according to ELCWT. For example, if ELCWT is 00, then no allocation is performed; if ELCWT is 01, no extraction occurs; if ELCWT is 10, then a cache line is allocated; and if ELCWT is 11, then the cache line is allocated and locked. If there is less than 32 bytes of data to extract from the received frame (e.g., EX_ADD<32B), flow proceeds to round up operation 1165 where EX_ADD is rounded up to a value of 32, and flow further proceeds to send 32B operation 1170.

After send 32B operation 1170, flow proceeds to decrement operation 1175 during which the extract add field is decremented by the number of 32 byte segments extracted (e.g., EX_ADD=EX_ADD–32). After decrement operation 1175, the extract data flag is cleared during clear operation 1180 if the end of frame (EOF) has been reached or if EX_ADD=0. After clear operation 1180, the extraction flow exits, and flow proceeds to EOF decision 1065 of FIG. 10.

In one embodiment, a portion of a message frame is received by system 100 at MAC 190 of packet controller 160. (See, FIG. 1 and FIG. 6, operation 610). The received portion of the message frame (the "received frame") is provided to a temporary queue 234 of address/data filter 230 of FIG. 2. The frame is processed by address/data filter 230 to determine if it should be accepted or rejected. (See FIG. 6, operation 620) Address recognition, hashing, hashing with pattern matching for perfect hashing, and pattern matching (FIGS. 7-9) are performed on the received frame by address recognition and hash logic 238 and pattern matching logic 232. Address recognition and hash logic 238 perform hashing and any necessary full direct address comparisons. PM registers 233 include a number of registers which correspond to a number of patterns to be matched. Pattern matching logic 232 performs the pattern matching based on configuration values stored in PM registers 233 (e.g., with continuous search and/or concatenation capabilities). If accepted after the pattern matching and hashing or other fail safe conditions, the received frame and pattern status information (pattern match results) are transferred to receive FIFO 220 (see, FIG. 6, operation 630.

The received frame is then transferred to receive buffer 211, and the pattern status information is transferred to status register 215 of DMA 210. (See FIG. 6, operation 640.) Extraction engine 212 accesses pattern attribute registers 213 and status register 215 to determine whether data should be extracted from the received frame in receive buffer 211, and controls the extraction of such data as applicable. (See FIGS. 10 and 11.) The BDFP accesses the status register 215 and the buffer descriptor address registers and generates address and data information to be written to memory 130 and/or cache 120. The address information from BDFP 214 includes a data buffer pointer within a data buffer for frame data (e.g., data buffer pointer 456) or pointer(s) to one of the next entries in a buffer descriptor queue (e.g., BDQ_BASE, BDQ_CURRENT, BDQ_NEXT). The data information includes status and control 452, data length 454, data buffer pointer 456, pattern match status 458, relative extract index 460, extract length 462 and byte count 464 shown in FIG. 4.

All or portions of the frame are then filed in memory 130 ("normal data") and/or stashed in cache 120 ("extracted data"), along with corresponding descriptive information in corresponding buffer descriptor queues 132/122. (See FIG. 6, operation 650, and FIGS. 10 and 11). More specifically, receive buffer 211 provides the normal or extracted frame data to bus interface unit (BIU) 170, the extraction engine provides attributes to BIU 170 which identify the frame data as normal or extracted, and the BDFP 214 provides address information and buffer descriptor data from the buffer descriptor address registers 216 to BIU 170. BIU 170 passes the frame data to bus 140 for storing in cache 120 and/or memory 130. Normal frame data is stored in at least one data buffer 134, and descriptor data regarding the normal frame data is stored in buffer descriptor queues 132. If extraction occurred, the extracted frame data is stored ("stashed") in cache portion 124, and descriptor data regarding the extracted frame data is stored in buffer descriptor queues 122.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description.

One embodiment incorporates a novel form of pattern matching which allows the user to program up to 16 four byte patterns which can be concatenated to form a longer pattern and used to match a portion of the frame within the first 256 bytes. Associated with each pattern is a set of attributes that can be programmed to accept/reject a frame, file a frame into one of four queues in memory, and to write extracted frame data into a processor's cache. The pattern matching capabilities include support for up to 16 4-byte unique patterns, pattern matching on a bit-by-bit basis, matching range up to 256 bytes deep into the frame, offsets up to 252 bytes, programmable pattern size in 4 byte increments up to 64 bytes, accept or reject frames when a match is detected, and up to 8 unicast addresses for exact matches.

This embodiment combines the power of pattern matching with the use of hash filtering to provide an address recognition method that does not require post filtering and can be done at the MAC level instead of requiring further software intervention at the logic link controller level. One way to accelerate the processing of frames is to increase the confidence that any destination address that happens to get a hit on the hash table is indeed one of the addresses the system is looking for. Since more than one address will have a CRC with the same 8 most significant bits, the use of a hash table with pattern matching provides a method of significantly increasing the chances that the extra processing that must be done on a hash hit (retrieving the address and comparing it to a list of valid destination addresses) is not wasted effort. This is valuable because it reduces the extra memory bus utilization caused by unintended hash table hits. The number of addresses that can be hashed is also limited by the fact that the hash table effectiveness declines as the number of addresses increases. Since the user builds the hash table first and since the number of addresses to be hashed is usually relatively low (32 to 64) it is relatively easy to find common patterns that could cover the majority if not all of his addresses. Using a handful of pattern match registers the user could insure that anything filed in the desired queue is a hit and can be processed without the need of a compare table.

In one embodiment, if the CRC checksum selects a bit that is set in the group/individual hash table, the frame is simply conditionally accepted pending the pattern match result. The vendor's code, for example, can be used with very high effectiveness as a pattern to match. The more selective the pattern is (the less bits used) the more effective the high confidence hash hit queue method becomes. With very selective pattern the number of addresses that can be used in the hash table can be increased and still remain effective. Another advantage of this embodiment is that while hashing by itself can not be used to reject a frame, without the risk of rejecting good frames, the combined pattern matching and hash filtering can be used to perform "frame rejection by hashing" since the uncertainty of hash collision is eliminated. A further flexibility is that the user can file the frames that the pattern matching and hash rejected in a "high probability of no match queue" so that the frames could be examined to further validate the effectiveness of the method.

As described herein, various control logic of ADF 230 is distributed among the aforementioned elements of ADF 230 and is not illustrated as a separate logic block. Alternatively, a separate control logic block may be included representative of, for example, a state machine for controlling the overall operation of ADF 230, including the pattern matching and hashing functionality. Such a state machine might include a number of states to implement the functionality described herein. For example, the state machine might transition from an idle state to a pattern status state upon data being received and the frame being accepted. In the pattern status state, the pattern status information may be made available to receive FIFO 220. The state machine can then transition to a temporary queue data phase in which a received frame is forwarded from temporary queue 234. The state machine then enters a frame status state in which the frame length and status associated with the destination address filtering (e.g., broadcast address, group/single address, promiscuous mode) are transferred to receive FIFO 220. Other states and state machines may be implemented in accordance with the functionality described herein.

In one embodiment, a method includes receiving a message and determining whether a first pattern match corresponding to a first pattern is detected within the received message, where the first pattern is indicated by pattern match data and has a corresponding inverse pattern indicator. When the first pattern match is detected, the message is selectively accepted based on the corresponding pattern match acceptance indicator. When the corresponding inverse pattern indicator has a first value, the first pattern match is detected when the first pattern is detected within the received message, and when the corresponding inverse pattern indicator has a second value, the first pattern match is detected when the first pattern is not detected within the received message.

In a further embodiment, receiving the message includes receiving at least a portion of a packet. In one embodiment, the packet is further characterized as an Ethernet packet. In a further embodiment, the corresponding pattern match acceptance indicator indicates one of acceptance, rejection, and neither acceptance nor rejection of the received message.

In a further embodiment, the first pattern has a corresponding continuous search enable indicator, where the message is selectively accepted based on the corresponding pattern acceptance indicator and the corresponding search enable indicator. In yet another further embodiment, when the first pattern match is detected and the pattern match acceptance indicator corresponding to the first pattern indicates acceptance of the received message, the received message is accepted when the continuous search indicator corresponding to the first pattern indicates no continuous searching. In yet another further embodiment, when the first pattern match is detected and the pattern match acceptance indicator corresponding to the first pattern indicates acceptance of the received message, the received message is accepted when the continuous search indicator corresponding to the first pattern indicates continuous searching, and a second pattern match corresponding to a second pattern is detected, the second pattern having a corresponding pattern match acceptance indicator which does not indicate rejection of the received message. In one embodiment, the second pattern is indicated by the pattern match data and the pattern match acceptance indicator corresponding to the second pattern indicates one of accepting the received message and neither accepting nor rejecting the received message. In one embodiment, the pattern match acceptance indicator corresponding to the second pattern indicates one of accepting the received message, neither accepting nor rejecting the received message, and pattern matching is disabled for the second pattern. In yet another further embodiment, the second pattern has a corresponding inverse pattern indicator, where when the inverse pattern indicator corresponding to the second pattern has the first value, the second pattern match is detected when the second pattern is detected within the received message, and when the inverse pattern indicator corresponding to the second pattern has the second value, the second pattern match is detected when the second pattern is not detected within the received message.

In another further embodiment, when the first pattern match is detected and the pattern match acceptance indicator corresponding to the first pattern indicates acceptance of the received message, the message is not accepted when the continuous search indicator corresponding to the first pattern indicates continuous searching, and a second pattern match corresponding to a second pattern is detected, the second pattern having a corresponding pattern match acceptance indicator which indicates rejection of the received message. In yet a further embodiment, the second pattern has a corresponding inverse pattern indicator, where when the inverse pattern indicator corresponding to the second pattern has the first value, the second pattern match is detected when the second pattern is detected within the received message, and when the inverse pattern indicator corresponding to the second pattern has the second value, the second pattern match is detected when the second pattern is not detected within the received message.

In another further embodiment, the method further includes rejecting the message when the first pattern is not detected. In yet another further embodiment, the first pattern has a corresponding match index which indicates a location within the received message at which to determine whether the first pattern match is detected. In yet another further embodiment, when the first pattern match is detected, the method further includes determining whether a second pattern match is detected within the received message, each of the first pattern and the second pattern having a corresponding concatenate indicator, wherein selectively accepting the message is based on the pattern match acceptance indicator corresponding to the first pattern and at least one of the concatenate indicator corresponding to the first pattern and the concatenate indicator corresponding to the second pattern. In this embodiment, when the second pattern match is detected and the at least one of the concatenate indicator corresponding to the first pattern and the concatenate indicator corresponding to the second pattern indicates concatenation of the first and second patterns, the message is selectively accepted when the pattern match acceptance indicator corresponding to the first pattern indicates acceptance of the received message. In this embodiment, when the second pattern match is not detected and the at least one of the concatenate indicator corresponding to the first pattern and the second pattern indicates concatenation of the first and second patterns, the first pattern match is deemed not detected.

In another further embodiment, the second pattern has a corresponding inverse pattern indicator, where when the inverse pattern indicator corresponding to the second pattern has a first value, the second pattern match is detected when the second pattern is detected within the received message, and when the inverse pattern indicator corresponding to the second pattern has a second value, the second pattern match is detected when the second pattern is not detected within the received message.

In another further embodiment, the method further includes performing a hash function to determine whether a hash hit occurs. In this embodiment, when a hash hit occurs, the first pattern match is detected, and the pattern match acceptance indicator corresponding to the first pattern indicates acceptance of the received message, the message is selectively accepted.

In another further embodiment, when the message is accepted, the method further includes selecting a buffer descriptor queue (BDQ) based on pattern match attributes, storing the message to memory according to the selected BDQ, and selectively storing at least a portion of the accepted message to cache. In this embodiment, the portion of the accepted message is indicated by the pattern match attributes. In yet another further embodiment, the pattern match attributes indicate one of a plurality of BDQs corresponding to the first pattern, the one of the plurality of BDQs corresponding to the selected BDQ. In yet another further embodiment, the pattern match attributes correspond to the first pattern. In yet another further embodiment, when the message is accepted, the message further includes determining whether a second pattern match exists corresponding to a second pattern, the pattern match attributes corresponding to the second pattern.

In yet another further embodiment, the pattern match attributes provide a pattern match extract indicator. In this embodiment, the portion of the accepted message is stored to cache when the pattern match extract indicator indicates that extraction is enabled, and the portion of the accepted message is not stored to cache when the pattern match extract indicator indicates that extraction is disabled. In yet another further embodiment, the pattern match attributes provide an extract index and an extract length to indicate the portion of the accepted message stored to cache.

In yet another further embodiment, when the message is accepted, the method further includes storing at least a portion of the selected BDQ to cache.

An alternate embodiment relates to a packet controller which includes an input, pattern matching logic, and control logic coupled to the pattern matching logic. In this embodiment, the input receives a message. The pattern matching logic determines whether a first pattern match corresponding to a first pattern is detected within the received message. The pattern matching logic includes at least one pattern match register which stores pattern match data which indicates the first pattern and stores pattern match control which includes a pattern match acceptance indicator corresponding to the first pattern and an inverse pattern indicator corresponding to the first pattern. The control logic selectively accepts the received message when the first pattern match is detected and the pattern match acceptance indicator corresponding to the first pattern indicates acceptance of the received message. When the corresponding inverse pattern indicator has a first value, the first pattern match is detected when the first pattern is detected within the received message. When the corresponding inverse pattern indicator has a second value, the first pattern match is detected when the first pattern is not detected within the received message.

In a further embodiment, the pattern match control further includes a concatenate indicator. In this embodiment, the pattern matching logic uses the concatenate indicator to determine whether the first pattern match is detected. In yet another further embodiment, when the concatenate indicator has a first value, the first pattern match corresponds to the first pattern and a second pattern. In this embodiment, the second pattern is indicated by second pattern match data stored within the at least one pattern match register. In yet another further embodiment, when the concatenate indicator has a second value, the first pattern match corresponds to the first pattern and not the second pattern. In yet another further embodiment, the pattern match control includes an inverse pattern indicator corresponding to the second pattern.

In another further embodiment, the pattern match control further includes a continuous search indicator. In this embodiment, the control logic selectively accepts the received message based on the continuous search indicator when the first pattern match is detected and the pattern match acceptance indicator corresponding to the first pattern indicates acceptance of the received message.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Those skilled in the art will recognize that boundaries between logic blocks are merely illustrative and that alternative embodiments may merge logic blocks or circuit elements or impose an alternate decomposition of functionality upon various logic blocks or circuit elements. Moreover, alternative embodiments may combine multiple instances of a particular component.

Furthermore, those skilled in the art will recognize that boundaries between the functionality of the above described operations merely illustrative. The functionality of multiple operations may be combined into a single operation, and/or the functionality of a single operations may be distributed in additional operations. Moreover, alternative embodiments may include multiple instances of a particular operation, and the order of operations may be altered or even performed in parallel in various other embodiments.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the features described. Furthermore, when a claim element is described in the claims below as including or comprising "a" feature, it is not intended that the element be limited to one and only one of the features described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the features described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. In a packet controller, a method comprising:
   receiving a message;
   determining whether a first pattern match corresponding to a first pattern is detected within the received message, wherein the first pattern is indicated by pattern match data and has a corresponding inverse pattern indicator and a corresponding pattern match acceptance indicator;
   when the first pattern match is detected, selectively accepting the message based on the corresponding pattern match acceptance indicator, wherein:
      when the corresponding inverse pattern indicator has a first value, the first pattern match is detected when the first pattern is detected within the received message, and
      when the corresponding inverse pattern indicator has a second value, the first pattern match is detected when the first pattern is not detected within the received message; and
   when the message is accepted, storing the accepted message.

2. The method of claim 1, wherein receiving the message comprises receiving at least a portion of a packet.

3. The method of claim 2, wherein the packet is further characterized as an Ethernet packet.

4. The method of claim 1, wherein the corresponding pattern match acceptance indicator indicates one of acceptance, rejection, and neither acceptance nor rejection of the received message.

5. The method of claim 1, wherein the first pattern has a corresponding continuous search enable indicator and wherein selectively accepting the message based on the corresponding pattern acceptance indicator comprises selectively accepting the message based on the corresponding pattern acceptance indicator and the corresponding search enable indicator.

6. The method of claim 5, wherein when the first pattern match is detected and the pattern match acceptance indicator corresponding to the first pattern indicates acceptance of the received message, accepting the received message when the continuous search indicator corresponding to the first pattern indicates no continuous searching.

7. The method of claim 5, wherein when the first pattern match is detected and the pattern match acceptance indicator corresponding to the first pattern indicates acceptance of the received message, accepting the received message when:
   the continuous search indicator corresponding to the first pattern indicates continuous searching, and
   a second pattern match corresponding to a second pattern is detected, the second pattern having a corresponding pattern match acceptance indicator which does not indicate rejection of the received message.

8. The method of claim 7, wherein the second pattern is indicated by the pattern match data and the pattern match acceptance indicator corresponding to the second pattern indicates one of accepting the received message and neither accepting nor rejecting the received message.

9. The method of claim 7, wherein the pattern match acceptance indicator corresponding to the second pattern indicates one of accepting the received message, neither accepting nor rejecting the received message, and pattern matching is disabled for the second pattern.

10. The method of claim 7, wherein the second pattern has a corresponding inverse pattern indicator, wherein:
   when the inverse pattern indicator corresponding to the second pattern has the first value, the second pattern match is detected when the second pattern is detected within the received message, and
   when the inverse pattern indicator corresponding to the second pattern has the second value, the second pattern match is detected when the second pattern is not detected within the received message.

11. The method of claim 5, wherein when the first pattern match is detected and the pattern match acceptance indicator corresponding to the first pattern indicates acceptance of the received message, not accepting the received message when:
   the continuous search indicator corresponding to the first pattern indicates continuous searching, and
   a second pattern match corresponding to a second pattern is detected, the second pattern having a corresponding pattern match acceptance indicator which indicates rejection of the received message.

12. The method of claim 11, wherein the second pattern has a corresponding inverse pattern indicator, wherein:
   when the inverse pattern indicator corresponding to the second pattern has the first value, the second pattern match is detected when the second pattern is detected within the received message, and when the inverse pattern indicator corresponding to the second pattern has the second value, the second pattern match is detected when the second pattern is not detected within the received message.

13. The method of claim 1, further comprising:
when the first pattern match is not detected, rejecting the message.

14. The method of claim 1, wherein the first pattern has a corresponding match index which indicates a location within the received message at which to determine whether the first pattern match is detected.

15. The method of claim 1, wherein when the first pattern match is detected, the method further comprises:
determining whether a second pattern match is detected within the received message, each of the first pattern and the second pattern having a corresponding concatenate indicator, wherein selectively accepting the message is based on the pattern match acceptance indicator corresponding to the first pattern and at least one of the concatenate indicator corresponding to the first pattern and the concatenate indicator corresponding to the second pattern;
when the second pattern match is detected and the at least one of the concatenate indicator corresponding to the first pattern and the concatenate indicator corresponding to the second pattern indicates concatenation of the first and second patterns, selectively accepting the message when the pattern match acceptance indicator corresponding to the first pattern indicates acceptance of the received message; and
when the second pattern match is not detected and the at least one of the concatenate indicator corresponding to the first pattern and the second pattern indicates concatenation of the first and second patterns, the first pattern match is deemed not detected.

16. The method of claim 15, wherein the second pattern has a corresponding inverse pattern indicator, wherein:
when the inverse pattern indicator corresponding to the second pattern has a first value, the second pattern match is detected when the second pattern is detected within the received message, and
when the inverse pattern indicator corresponding to the second pattern has a second value, the second pattern match is detected when the second pattern is not detected within the received message.

17. The method of claim 1, further comprising:
performing a hash function to determine whether a hash hit occurs, wherein when a hash hit occurs, the first pattern match is detected, and the pattern match acceptance indicator corresponding to the first pattern indicates acceptance of the received message, selectively accepting the message.

18. The method of claim 1, wherein when the message is accepted, the method further comprises:
selecting a buffer descriptor queue (BDQ) based on pattern match attributes;
storing the message to memory according to the selected BDQ; and
selectively storing at least a portion of the accepted message to cache, wherein the portion of the accepted message is indicated by the pattern match attributes.

19. The method of claim 18, wherein the pattern match attributes indicate one of a plurality of BDQs corresponding to the first pattern, wherein the one of the plurality of BDQs corresponds to the selected BDQ.

20. The method of claim 18, wherein the pattern match attributes correspond to the first pattern.

21. The method of claim 18, wherein when the message is accepted, the message further comprises:
determining whether a second pattern match exists corresponding to a second pattern, wherein the pattern match attributes correspond to the second pattern.

22. The method of claim 18, wherein the pattern match attributes provide a pattern match extract indicator, and wherein the portion of the accepted message is stored to cache when the pattern match extract indicator indicates that extraction is enabled and the portion of the accepted message is not stored to cache when the pattern match extract indicator indicates that extraction is disabled.

23. The method of claim 22, wherein the pattern match attributes provide an extract index and an extract length to indicate the portion of the accepted message stored to cache.

24. The method of claim 18, wherein when the message is accepted, the method further comprises:
storing at least a portion of the selected BDQ to cache.

25. A packet controller, comprising:
an input which receives a message;
pattern matching logic which determines whether a first pattern match corresponding to a first pattern is detected within the received message, wherein the pattern match logic comprises at least one pattern match register which stores pattern match data which indicates the first pattern and stores pattern match control which includes a pattern match acceptance indicator corresponding to the first pattern and an inverse pattern indicator corresponding to the first pattern; and
control logic, coupled to the pattern matching logic, which selectively accepts the received message when the first pattern match is detected and the pattern match acceptance indicator corresponding to the first pattern indicates acceptance of the received message, wherein:
when the corresponding inverse pattern indicator has a first value, the first pattern match is detected when the first pattern is detected within the received message, and
when the corresponding inverse pattern indicator has a second value, the first pattern match is detected when the first pattern is not detected within the received message.

26. The packet controller of claim 25, wherein the pattern match control further includes a concatenate indicator, and wherein the pattern matching logic uses the concatenate indicator to determine whether the first pattern match is detected.

27. The packet controller of claim 26, wherein when the concatenate indicator has a first value, the first pattern match corresponds to the first pattern and a second pattern, the second pattern indicated by second pattern match data stored within the at least one pattern match register.

28. The packet controller of claim 27, wherein when the concatenate indicator has a second value, the first pattern match corresponds to the first pattern and not the second pattern.

29. The packet controller of claim 27, wherein the pattern match control includes an inverse pattern indicator corresponding to the second pattern.

30. The packet controller of claim 25, wherein the pattern match control further includes a continuous search indicator, and wherein the control logic selectively accepts the received message based on the continuous search indicator when the first pattern match is detected and the pattern match acceptance indicator corresponding to the first pattern indicates acceptance of the received message.

* * * * *